(12) United States Patent
Stadler et al.

(10) Patent No.: US 12,466,255 B2
(45) Date of Patent: Nov. 11, 2025

(54) SYSTEMS AND METHODS FOR SCALABLE COCKPIT CONTROLLER

(71) Applicant: Harman Becker Automotive Systems GmbH, Karlsbad-Ittersbach (DE)

(72) Inventors: Marco Stadler, Waldbronn (DE); Frank Gitzinger, Baden-Württemberg (DE); Christian Schanz, Neuenburg (DE); Gregor Slatosch, Straubenhardt (DE); Peter Stachulla, Keltern (DE); Frank Foerderer, Gaggenau (DE); Jibin Yuan, Ettlingen (DE); Guenther Kraft, Karlsruhe (DE)

(73) Assignee: HARMAN BECKER AUTOMOTIVE SYSTEMS GMBH, Karlsbad-Ittersbach (DE)

( * ) Notice: Subject to any disclaimer, the term of this patent is extended or adjusted under 35 U.S.C. 154(b) by 366 days.

(21) Appl. No.: 18/052,115

(22) Filed: Nov. 2, 2022

(65) Prior Publication Data
US 2023/0176998 A1    Jun. 8, 2023

Related U.S. Application Data

(60) Provisional application No. 63/362,444, filed on Apr. 4, 2022, provisional application No. 63/264,283, filed on Nov. 18, 2021.

(51) Int. Cl.
*G06F 13/40* (2006.01)
*B60K 35/00* (2024.01)
(Continued)

(52) U.S. Cl.
CPC ............. *B60K 35/00* (2013.01); *B60K 35/10* (2024.01); *B60K 35/22* (2024.01); *B60K 35/28* (2024.01); *B60K 35/85* (2024.01); *B60K 37/00* (2013.01); *B60R 16/0207* (2013.01); *B60R 16/023* (2013.01); *G06F 3/14* (2013.01);
(Continued)

(58) Field of Classification Search
CPC ............ B60K 2360/42; B60K 2360/46; B60K 2360/583; B60K 2360/586; B60K 2360/691; B60K 35/10; B60K 35/85; B60K 37/00; B60R 16/0231; G06F 13/128; G06F 13/385; G06F 13/409; G06F 9/4451;
(Continued)

(56) References Cited

U.S. PATENT DOCUMENTS 8,781,442 B1    7/2014   Link, II
9,152,182 B1    10/2015  McMahon et al.
(Continued)

OTHER PUBLICATIONS

European Patent Office, Extended European Search Report Issued in Application No. 22206077.4, Mar. 20, 2023, Germany, 12 pages.
(Continued)

*Primary Examiner* — Charles J Han
(74) *Attorney, Agent, or Firm* — McCoy Russell LLP

(57) ABSTRACT

Embodiments are disclosed for a system for coupling with at least one vehicle cable for communication with components of an infotainment system. In one example, the system includes a housing and a domain controller with hardware components enclosed within the housing. The system may further include a first connector interface arranged at a first side of the housing, the first connector interface including all connections for the domain controller.

6 Claims, 15 Drawing Sheets

(51) Int. Cl.
    *B60K 35/10*     (2024.01)
    *B60K 35/22*     (2024.01)
    *B60K 35/28*     (2024.01)
    *B60K 35/85*     (2024.01)
    *B60K 37/00*     (2024.01)
    *B60R 16/02*     (2006.01)
    *B60R 16/023*     (2006.01)
    *G06F 3/14*     (2006.01)
    *G06F 15/78*     (2006.01)
    *H04L 9/40*     (2022.01)

(52) U.S. Cl.
    CPC .......... *G06F 13/40* (2013.01); *G06F 15/7814* (2013.01); *H04L 63/08* (2013.01); *B60K 2360/164* (2024.01)

(58) Field of Classification Search
    CPC ....... H04L 63/08; H04L 67/12; H04L 67/306; H04W 12/06
    See application file for complete search history.

(56) References Cited

U.S. PATENT DOCUMENTS

| | | |
|---|---|---|
| 11,650,851 B2 | 5/2023 | Palermo et al. |
| 2007/0115808 A1 | 5/2007 | Ying |
| 2015/0373482 A1 | 12/2015 | Barnard et al. |
| 2016/0128238 A1 | 5/2016 | Shedd et al. |
| 2016/0234954 A1 | 8/2016 | Troemel, Jr. et al. |
| 2017/0080949 A1 | 3/2017 | Sinaguinan |
| 2018/0286913 A1 | 10/2018 | Wang et al. |
| 2019/0155778 A1* | 5/2019 | Fox .................... G06F 13/4282 |
| 2020/0186970 A1 | 6/2020 | Dekovich et al. |
| 2020/0209867 A1 | 7/2020 | Valois et al. |
| 2020/0272455 A1 | 8/2020 | Mezaael |
| 2021/0120259 A1 | 4/2021 | Nair et al. |
| 2021/0190516 A1 | 6/2021 | Ventimiglia et al. |
| 2021/0210429 A1 | 7/2021 | Liu et al. |
| 2021/0282300 A1 | 9/2021 | Gopalakrishna et al. |
| 2022/0104359 A1 | 3/2022 | Patil et al. |
| 2022/0142011 A1 | 5/2022 | Doo et al. |
| 2022/0326743 A1 | 10/2022 | Kraft et al. |
| 2022/0352622 A1 | 11/2022 | Choudhury et al. |

OTHER PUBLICATIONS

European Patent Office, Extended European Search Report Issued in Application No. 22206084.0 Mar. 28, 2023, Germany, 9 pages.
Stadler, M. et al., "Systems and Methods for Scalable Cockpit Controller With Generic and Reconfigurable Car-Interface," U.S. Appl. No. 18/052,118, filed Nov. 2, 2022, 67 pages.

* cited by examiner

SYSTEMS AND METHODS FOR SCALABLE COCKPIT CONTROLLER

CROSS REFERENCE TO RELATED APPLICATIONS

The present application claims priority to U.S. Provisional Application No. 63/264,283, entitled "SYSTEMS AND METHODS FOR SCALABLE COCKPIT CONTROLLER WITH CAR-INTERFACE", and filed on Nov. 18, 2021, and to U.S. Provisional Application No. 63/362,444, entitled "SYSTEMS AND METHODS FOR SCALABLE COCKPIT CONTROLLER WITH GENERIC AND RECONFIGURABLE CAR-INTERFACE", and filed on Apr. 4, 2022. The entire contents of the above-listed applications are hereby incorporated by reference for all purposes.

FIELD

The disclosure relates to the field of standardized car interface for cockpit controllers in vehicles.

BACKGROUND

A vehicle may include an infotainment system provided within a passenger cabin of the vehicle. For example, the infotainment system may be present at a dashboard compartment, where the infotainment system may be operated, e.g., controlled and monitored, by a cockpit domain controller (also a cockpit or a cockpit controller). The cockpit domain controller may drive multiple functional domains within the car, including center displays and infotainment, instrumentation clusters, advanced driver assist systems (ADAS), audio and sound management, lighting, e-mirrors, navigation, drive assist, and also an intelligent personal assistant. As such, the infotainment system may include a plurality of different connections to communicatively couple to the cockpit domain controller system via a number of BUS systems, including CAN and Ethernet. A head-unit of the cockpit domain controller may be configured to interface with the user, e.g., through the use of a touch screen and/or display.

Furthermore, current automotive trends are motivating efforts to increase complexity of the cockpit domain controller due to developments in control architecture and enhanced communication channel performance capabilities. In order to satisfy such targets, a greater number of ports for communicative connectors may be demanded of the cockpit domain controller while conserving circuit board space and housing size to meet packaging space constraints

SUMMARY

Embodiments are disclosed herein for system for coupling with at least one vehicle cable for communication with components of an infotainment system, comprising a housing, a domain controller with hardware components enclosed within the housing, and a first connector interface arranged at a first side of the housing, the first connector interface including all connections for the domain controller.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined distinctly by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
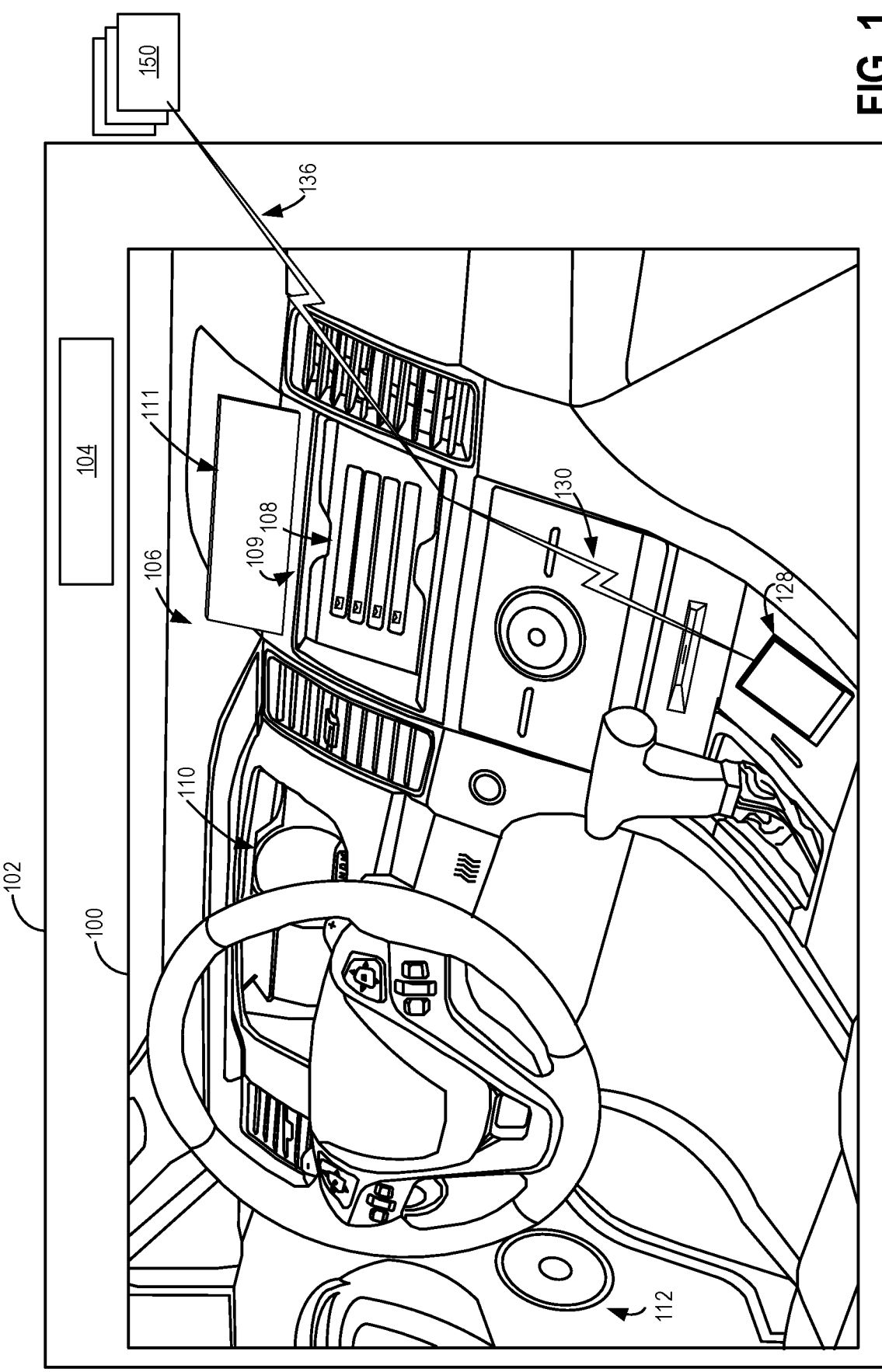
FIG. 1 shows an example partial view of a vehicle cabin in accordance with one or more embodiments of the present disclosure.

As described above, a vehicle may include an infotainment system, which may include, among other components, a collection of speakers, one or more radio antennas, and other multimedia subsystems. The infotainment system may further include a cockpit domain controller (also referred to as a cockpit or a cockpit controller), relying on a head-unit, which may be configured to process audio, to allow the user to choose media to listen to, and generate audio usable for speakers, to generate video media, to generate directions, e.g. through the use of a Global Navigation Satellite System (GNSS), among other functions.

Conventionally, the head-unit of a vehicle may be connected to the other subsystems of the vehicle infotainment system via one of a variety of different electrical connections. As a result of limited standardization of such an interface between the head-unit and the other subsystems, exchanging the head-unit for a different head-unit may demand extensive and costly modification of the interface, which may be deterring to a user or consumer. Furthermore, within conventional interface systems, authentication of a new head-unit installed within the interface may be challenging, which may lead to loss of user preferences stored within the original head-unit. The interface may be specific to the original head-unit in many instances, such that replacement of the head-unit may demand replacement of the infotainment system as well.

The above-mentioned difficulties in replacing the head-unit may contribute to a user's reluctance to upgrade a head-unit and, as a consequence, the head-unit may become outdated over time, and incompatible with new infotainment features, including new audio processing algorithms, new user-configurable settings, additional usable audio channels, and the like. It will be appreciated that while some aspects of the present application are particularly applicable to head-unit replacements and/or upgrades, other applications have been contemplated. In one example, during original vehicle assembly, identification of the originally-installed head-unit may enable automatic initial configuration of a cockpit controller.

Thus, according to the embodiments described herein, an interface with connectors is usable to couple a first head-unit to a vehicle infotainment system. If a user wishes to replace the first head-unit with a second head-unit, the user settings from the first head-unit may be downloaded to the interface. The first head-unit may be exchanged for the second head-unit, which may be authorized by the interface. The interface may then transmit the user settings from the first head-unit to the second head-unit, allowing the user settings to persist within the second head-unit instead of being lost. Furthermore, the connectors within the interface may be used according to specifications obtained from the second head-unit.

In addition, the user may wish to incorporate additional subsystems, such as audio systems and other auxiliary devices, into the vehicle. In order to enable user control over the additional subsystems, mechanical and communicative coupling of the additional subsystems to the cockpit domain controller may be challenging due to a lack of available ports at the cockpit domain controller. For example, upon manufacturing of the cockpit domain controller, the cockpit domain controller may be configured with a number of connection interfaces corresponding to known subsystems of the vehicle in which the cockpit domain controller is to be installed. As a result, replacing of the domain cockpit controller may be demanded, or use of additional hardware components may be demanded in order to indirectly couple the additional subsystems to the cockpit domain controller via extension devices, causing inconvenience and cost to the user. In addition, in order to accommodate an increased number of desired interfaces, an increase in a size of the cockpit domain controller may be demanded. The size of the cockpit domain controller, however, is constrained by available packaging space within the vehicle.

In one example, capabilities of the infotainment system may be expanded by configuring the cockpit domain controller with a scalable connectivity architecture. The scalable connectivity architecture may maximize an amount of interfaces of the cockpit domain controller, thereby obviating increases in a footprint of the cockpit domain controller. The cockpit domain controller may further be adapted with computing modules included in the scalable connectivity architecture for communicative coupling with the vehicle subsystems. In some examples, the scalable connectivity architecture may be retrofit to an already existing vehicle system, e.g., adapted to an already configured vehicle computing system relying on a cockpit domain controller for enabling user control over vehicle subsystems. Further details of the scalable connectivity architecture are provided below, with reference to FIGS. 9-15.

As such, the interface for head-unit exchange and the scalable connectivity unit, as described herein, may each be integrated into a single unit forming the cockpit domain controller. The cockpit domain controller may retain a widely used silver box configuration, but be adapted with modularity, scalability (with respect to number of subsystems coupled thereto), and upgradability at low cost, while being readily retrofit to already existing vehicle systems.

Figure 2:
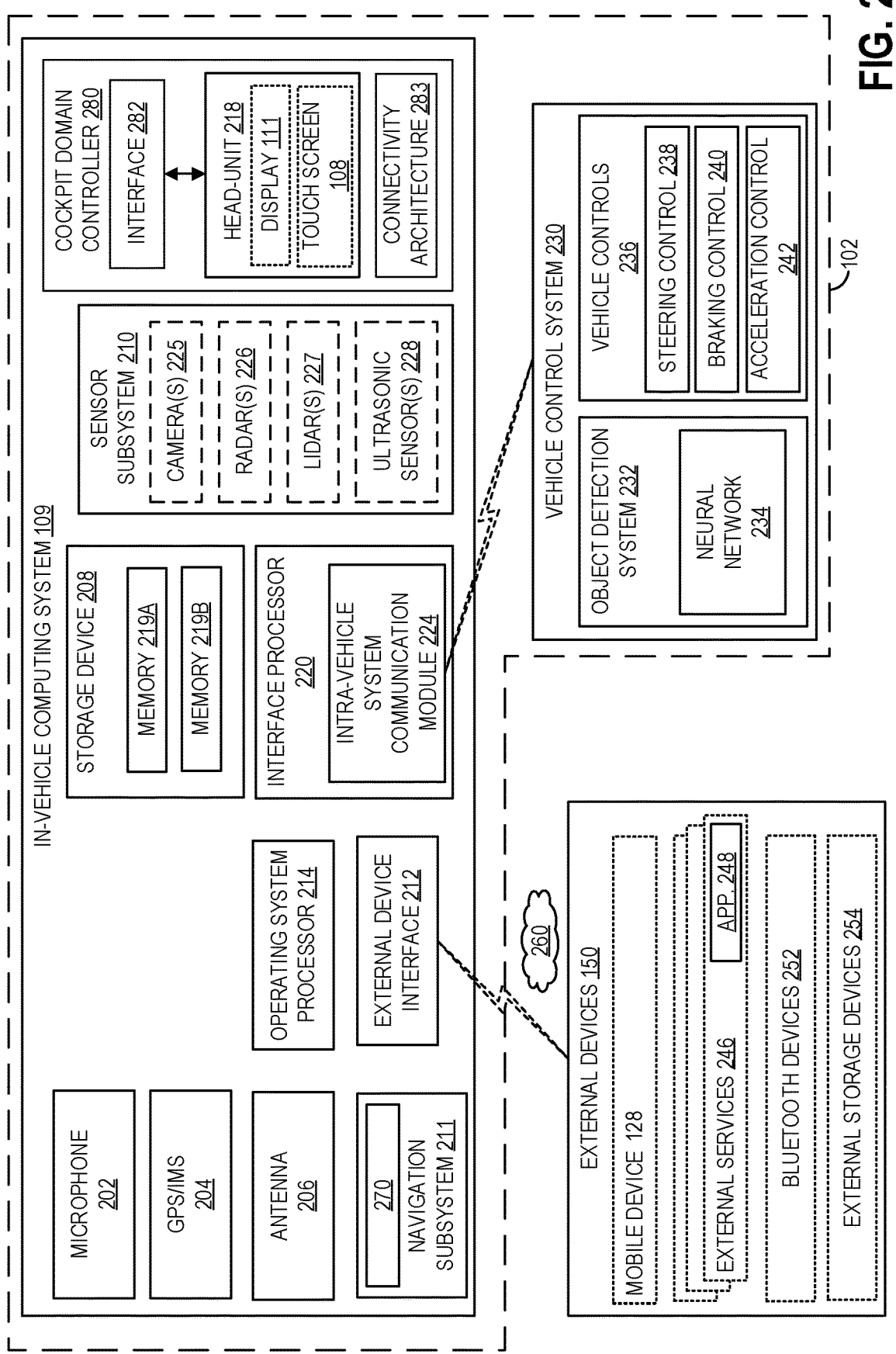
FIG. 2 shows a block diagram of an example in-vehicle computing system of a vehicle with a cockpit domain controller, in accordance with one or more embodiments of the present disclosure.
Figure 3:
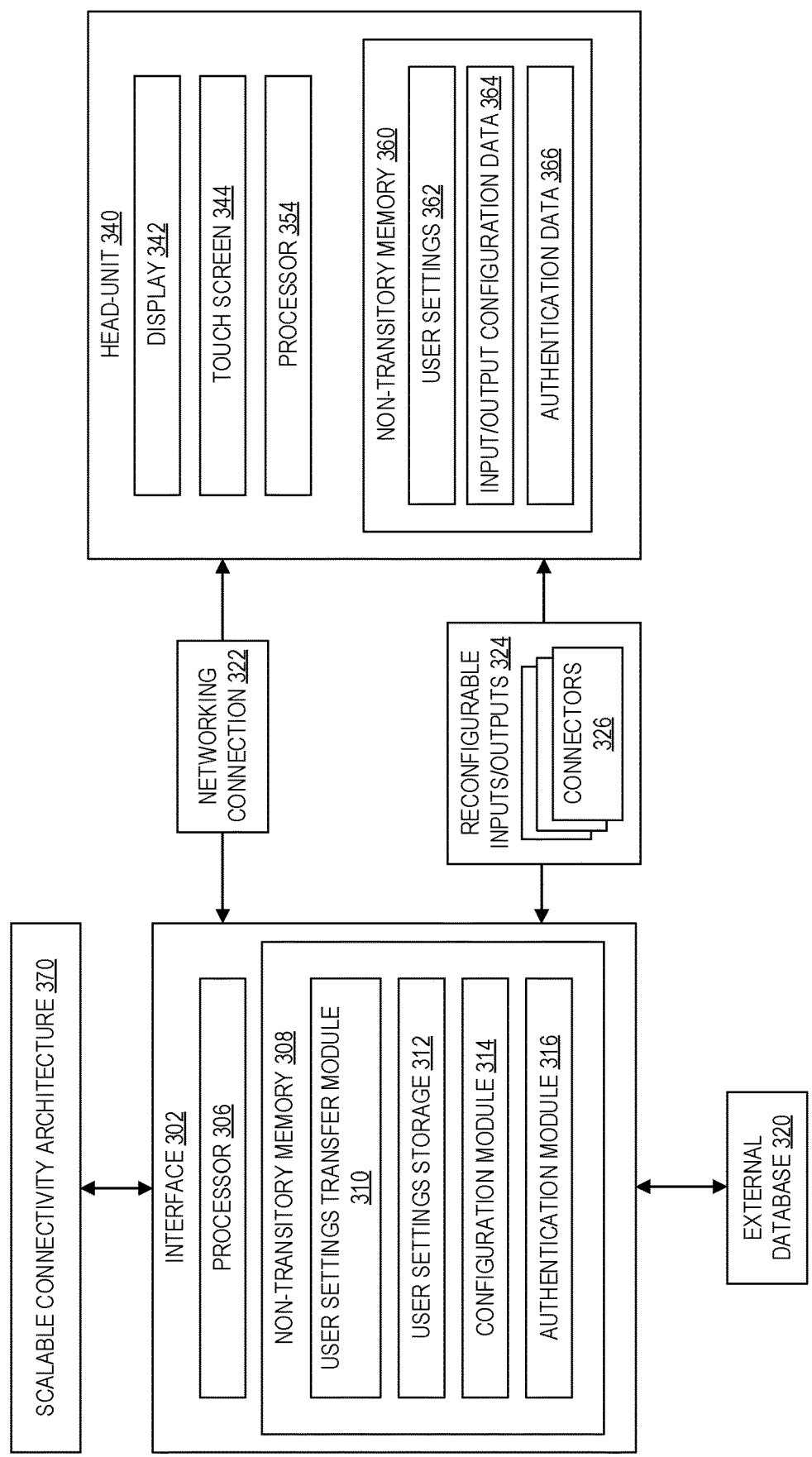
FIG. 3 shows a block diagram of an interface and a head-unit which may be included in the cockpit domain controller.
Figure 4:
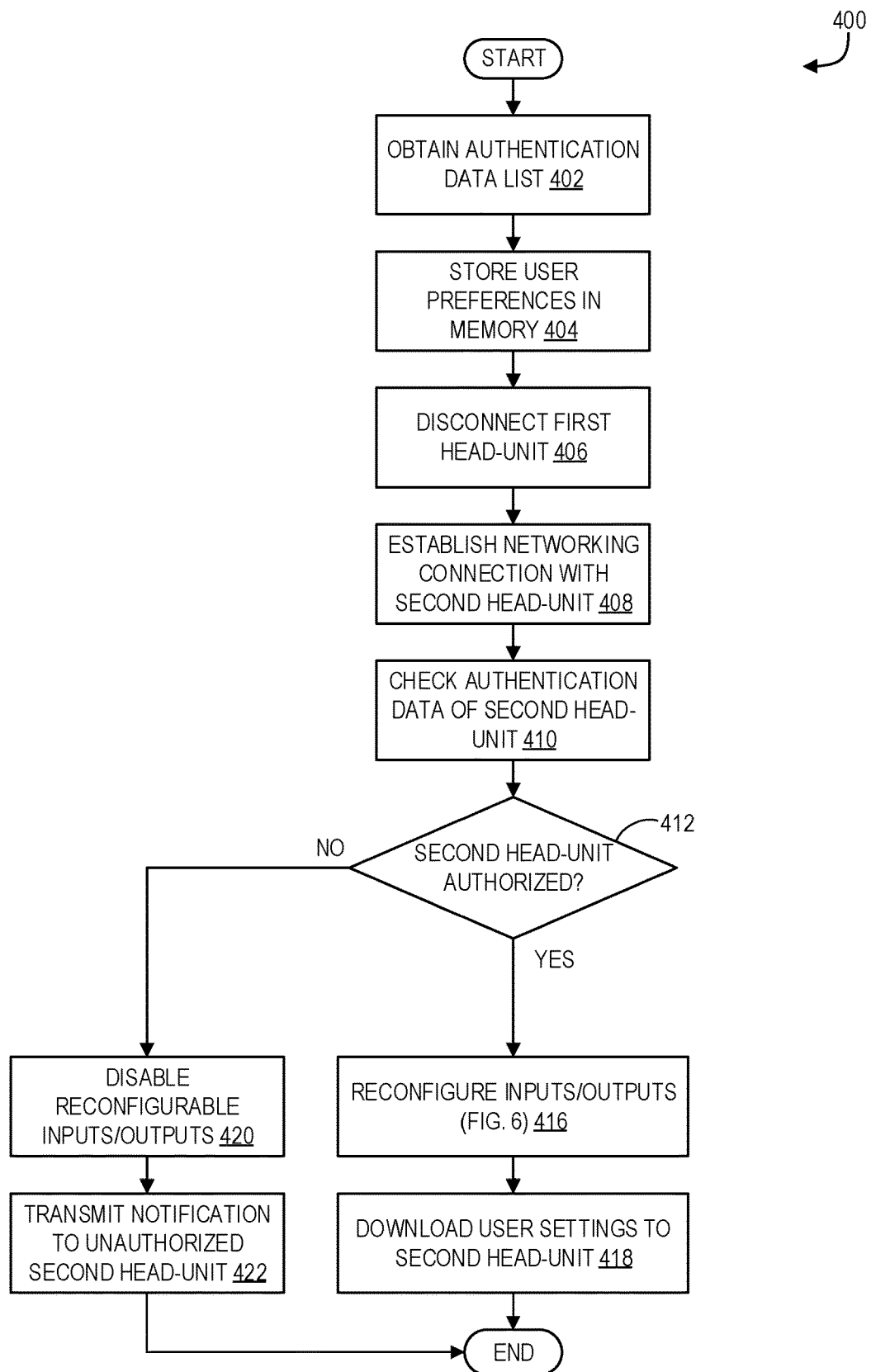
FIG. 4 shows an example of a method for transferring data from a first head-unit to a second head-unit and configuring the second head-unit for use in the cockpit domain controller.
Figure 5:
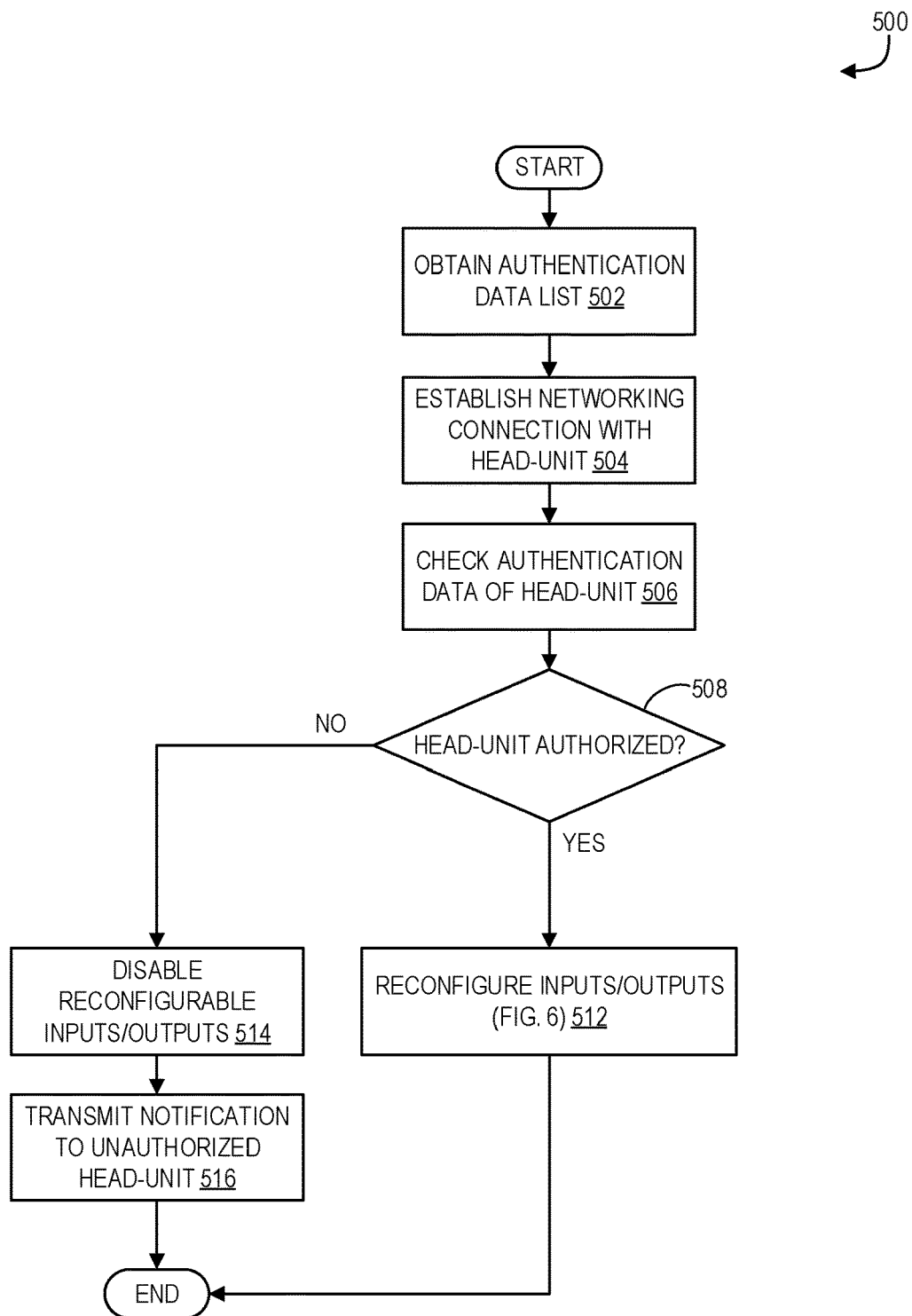
FIG. 5 shows an example of a method for coupling a head-unit to the cockpit domain controller.
Figure 6:
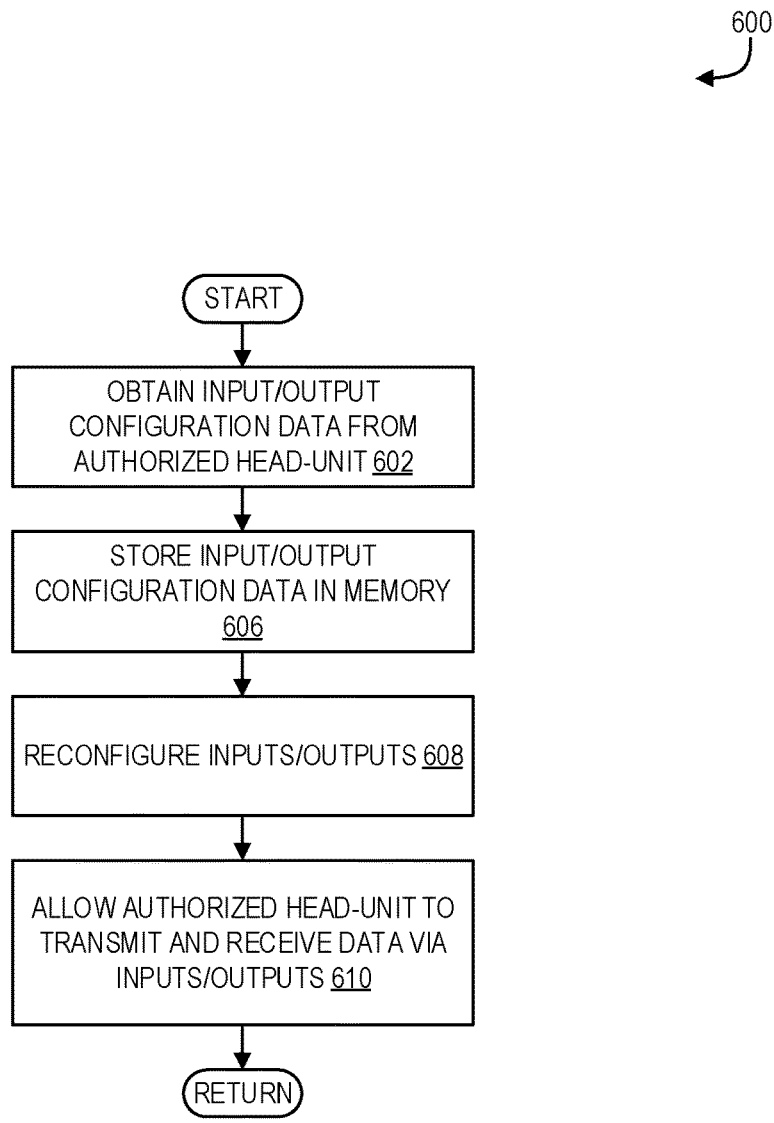
FIG. 6 shows an example of a method for reconfiguring inputs/outputs of the cockpit domain controller according to data from a head-unit.
Figure 7:
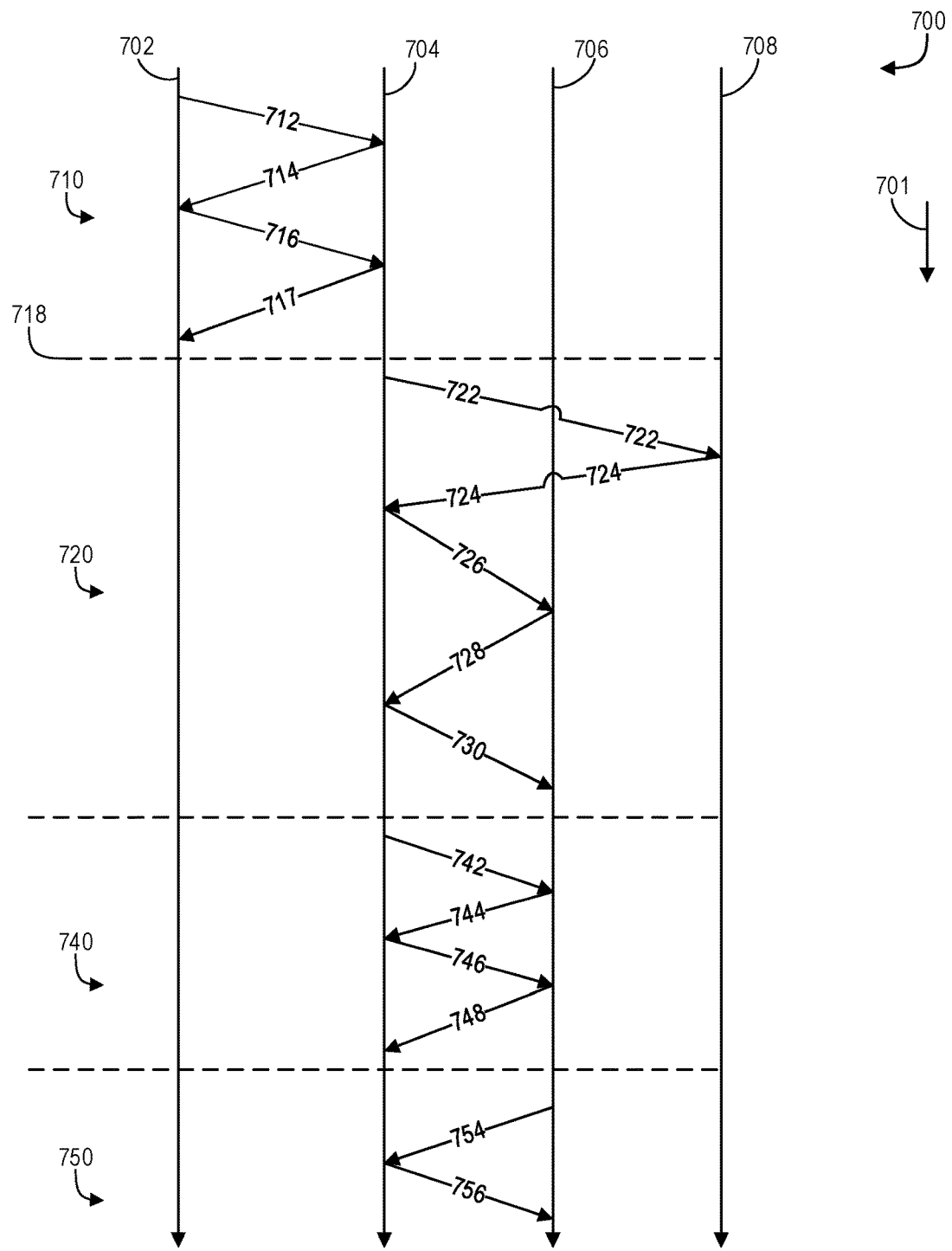
FIG. 7 shows an example communication diagram between a first head-unit, a second head-unit, an interface, and an external database during an exchange of the first head-unit for the second head-unit.
Figure 8:
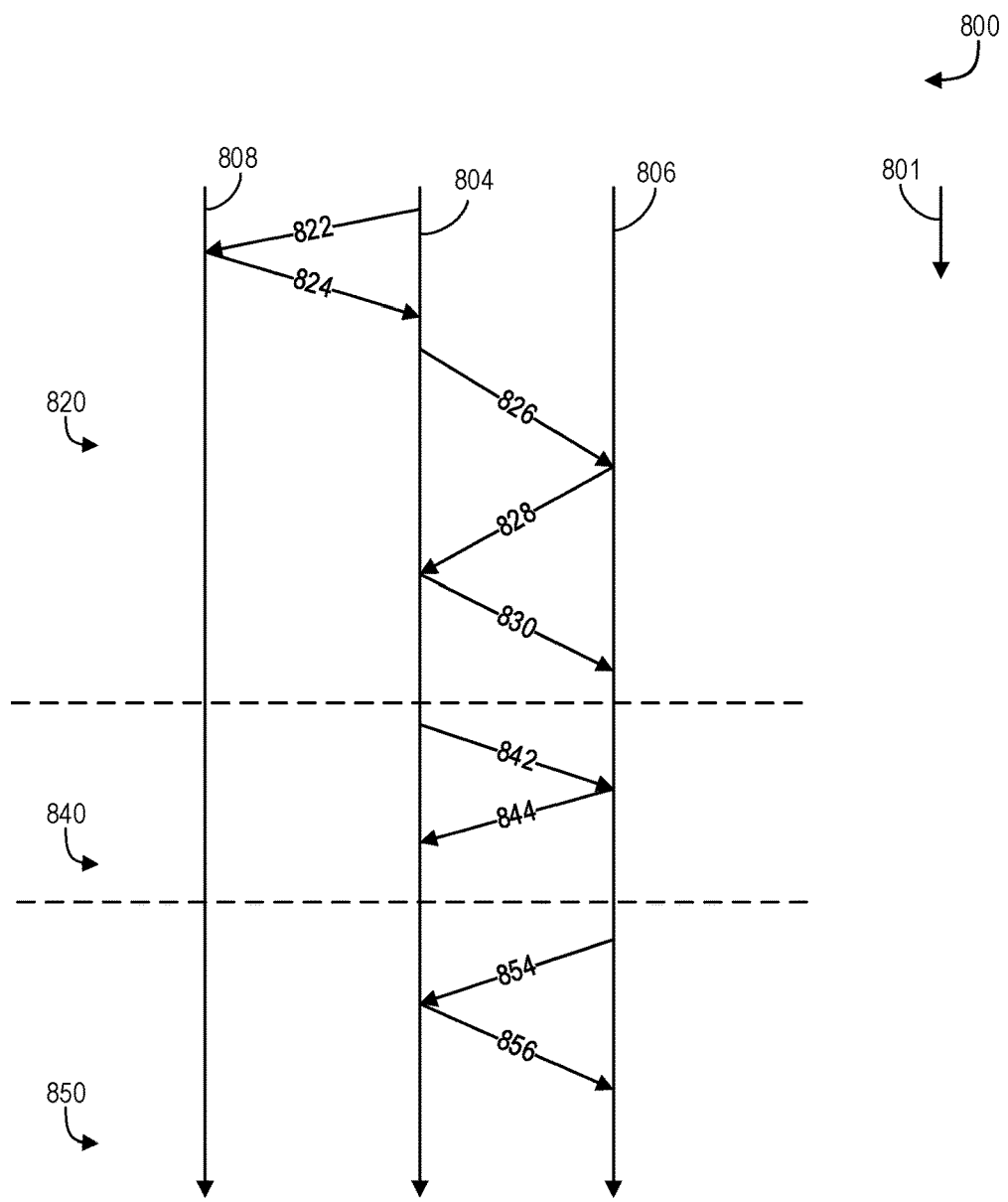
FIG. 8 shows an example communication diagram between a head-unit, an interface, and an external database during an installation of the head-unit.

As described herein, a vehicle, such as the vehicle shown in FIG. 1, may include a scalable and/or modular cockpit domain controller controlling an infotainment system. The vehicle shown in FIG. 1 may include an in-vehicle computing system and a vehicle control system, as shown in FIG. 2. The in-vehicle computing system may further include a cockpit domain controller which may incorporate an interface and a head-unit as depicted in FIG. 3. Examples of methods for populating a new head-unit, replacing an original head-unit, with data from the original head-unit, for coupling the new head-unit with the cockpit domain controller components, and for reconfiguring inputs/outputs of the cockpit domain controller for compatibility with the new-head unit are shown in FIGS. 4-6. Communication diagrams representing flow of data between the new head-unit, the original head-unit, an external database, and the interface, are depicted in FIGS. 7 and 8.

Figure 9:
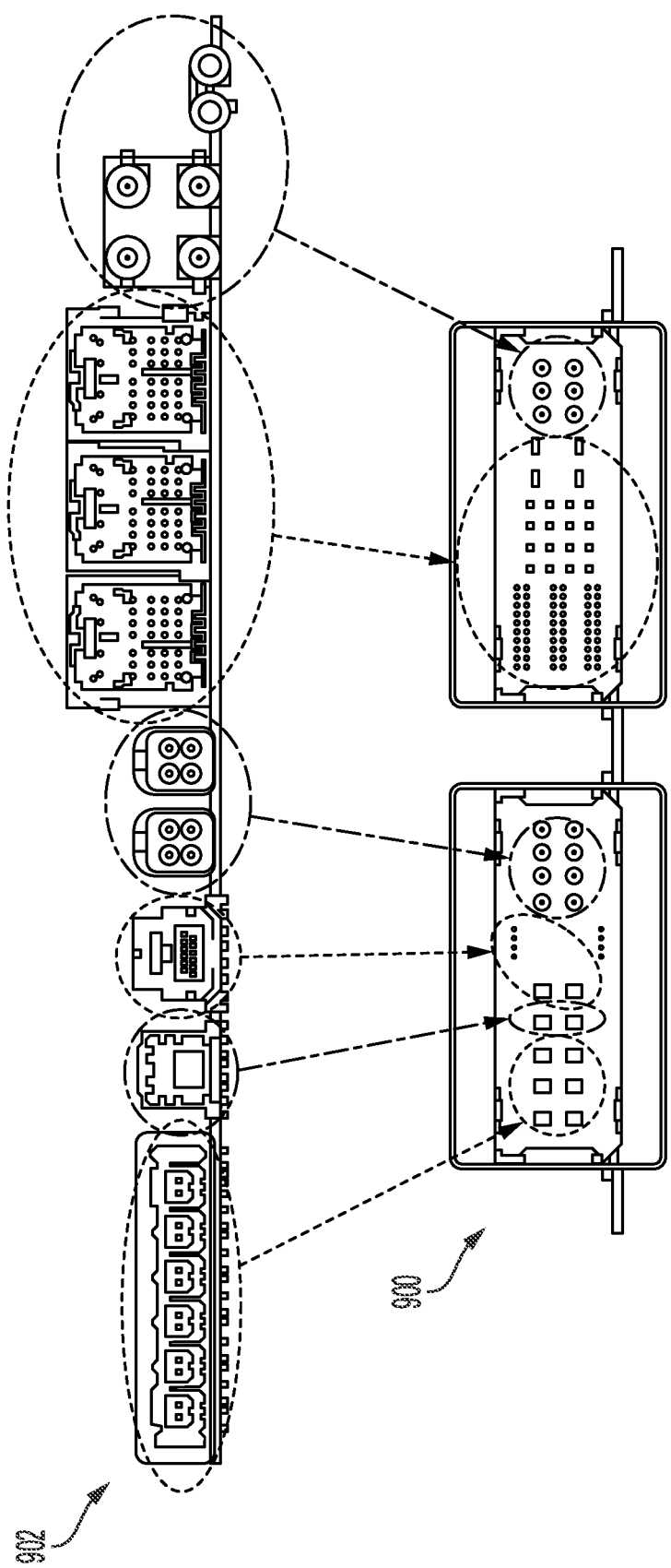
FIG. 9 shows an example of modular headers of the cockpit domain controller for coupling the cockpit domain controller to subsystems of a vehicle via a scalable connectivity architecture of the cockpit domain controller.
Figure 10:
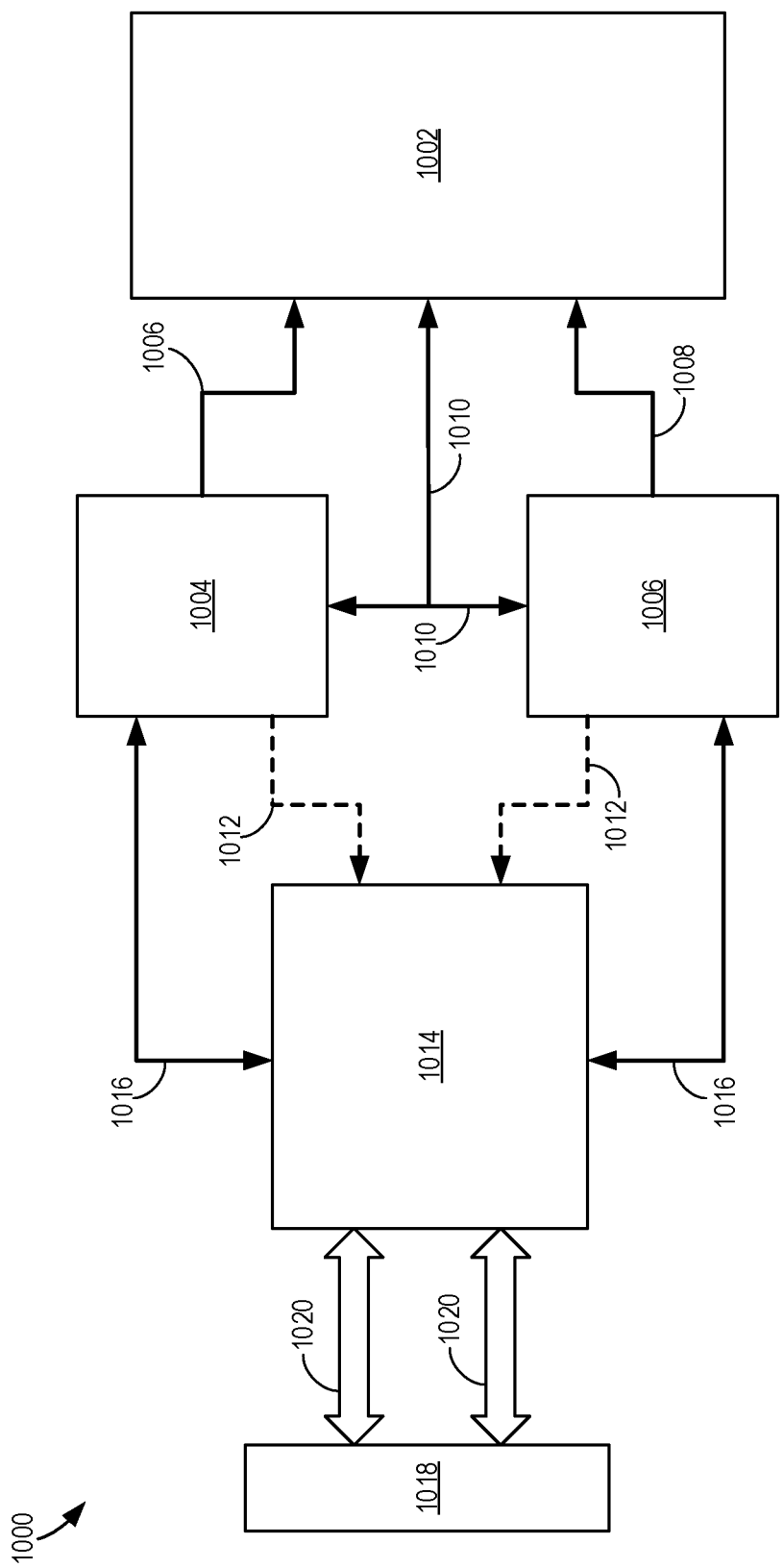
FIG. 10 shows an electronic configuration of the scalable connectivity architecture of the cockpit domain controller.
Figure 11:
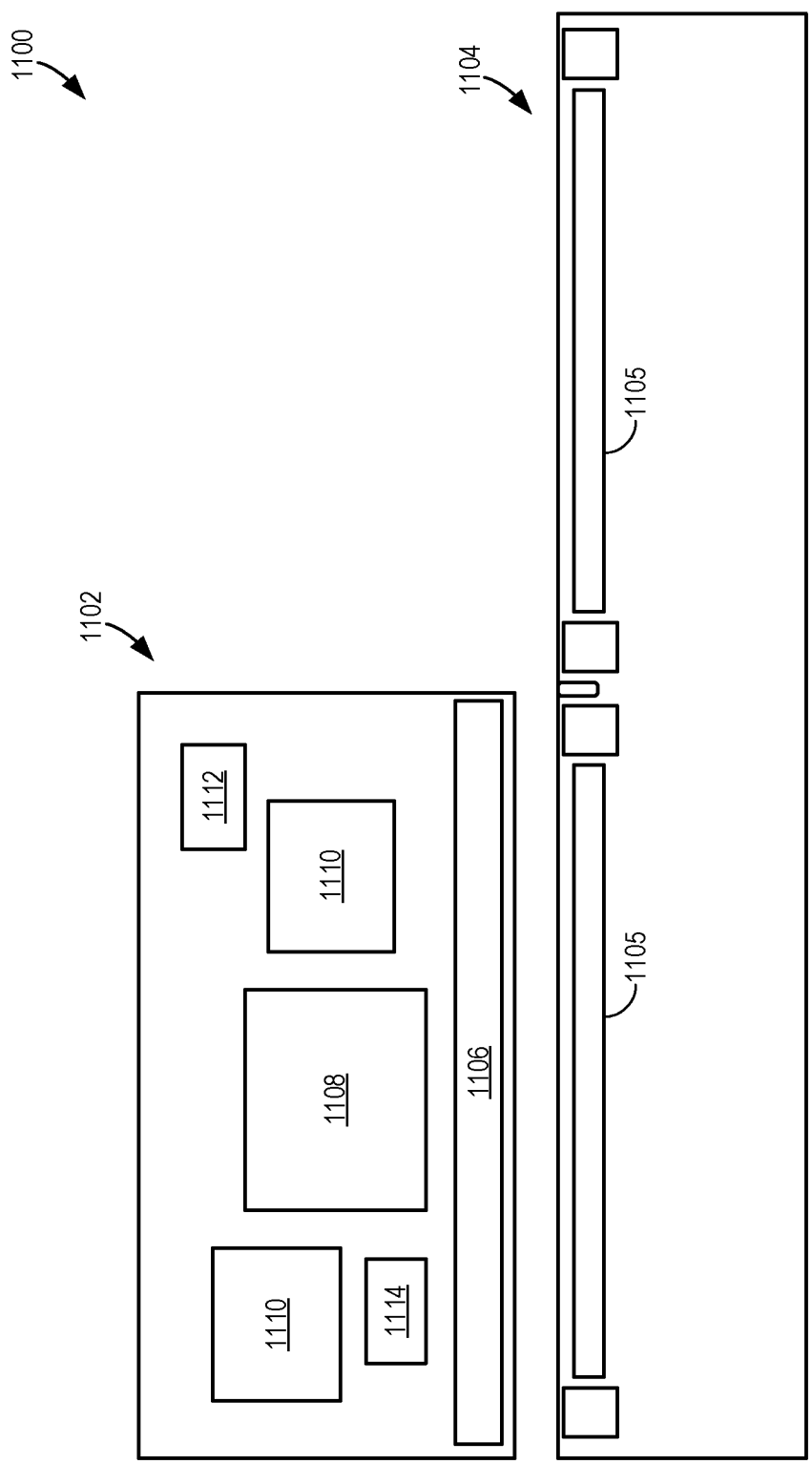
FIG. 11 shows a first example of an electromechanical construction of a compute module of the scalable connectivity architecture of the cockpit domain controller.
Figure 12:
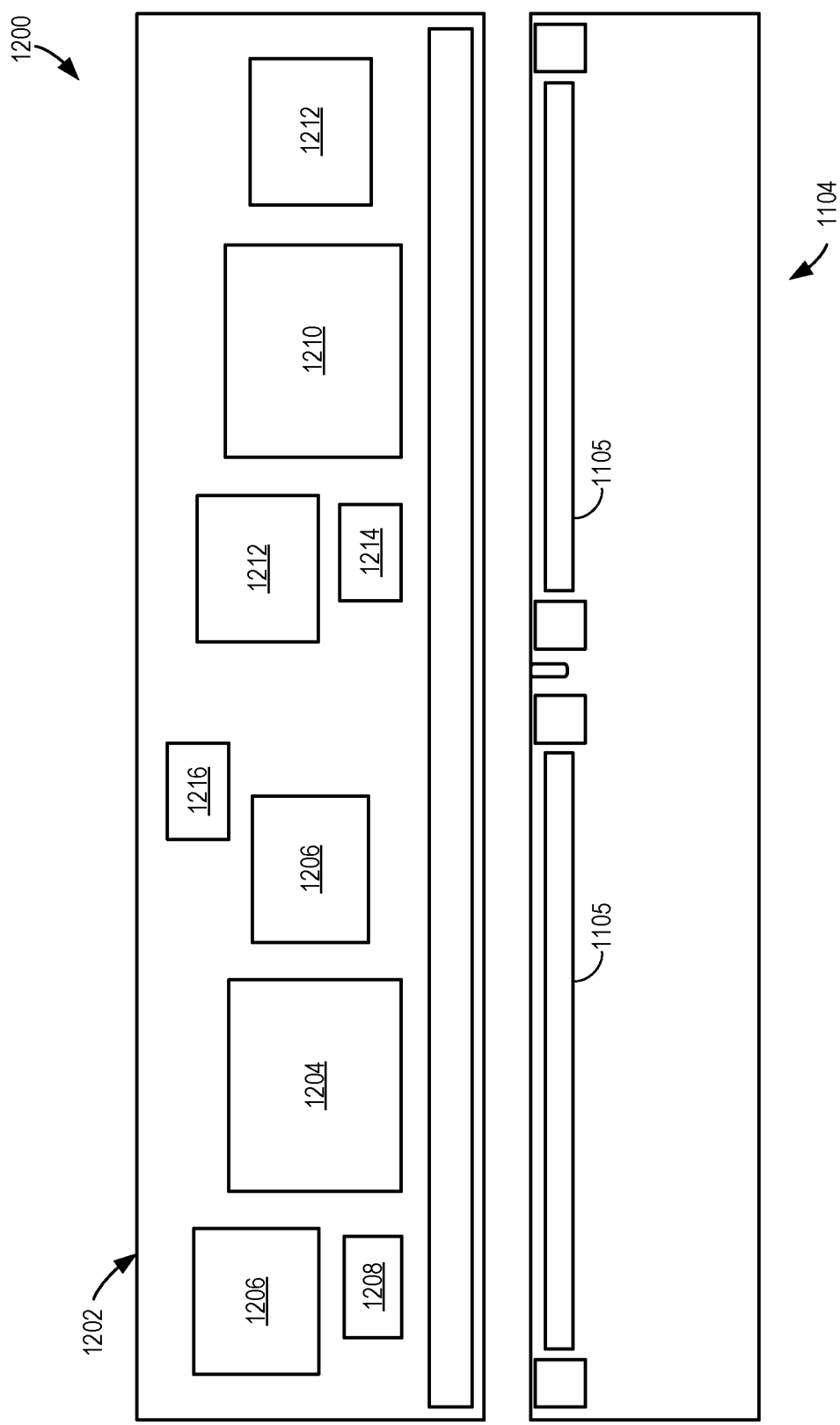
FIG. 12 shows a second example of an electromechanical construction of a compute module of the scalable connectivity architecture of the cockpit domain controller.
Figure 13:
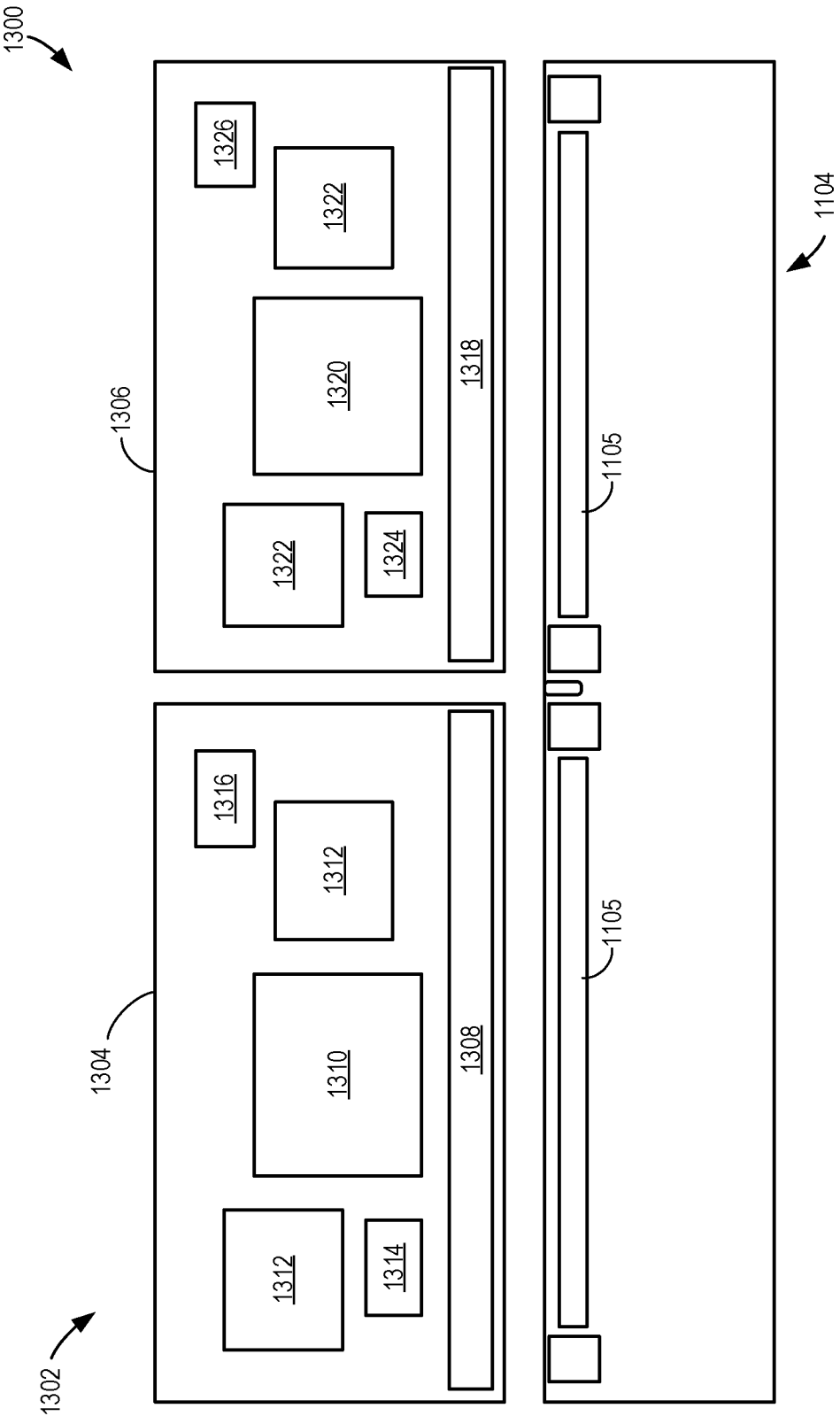
FIG. 13 shows a third example of an electromechanical construction of a compute module of the scalable connectivity architecture of the cockpit domain controller.
Figure 14:
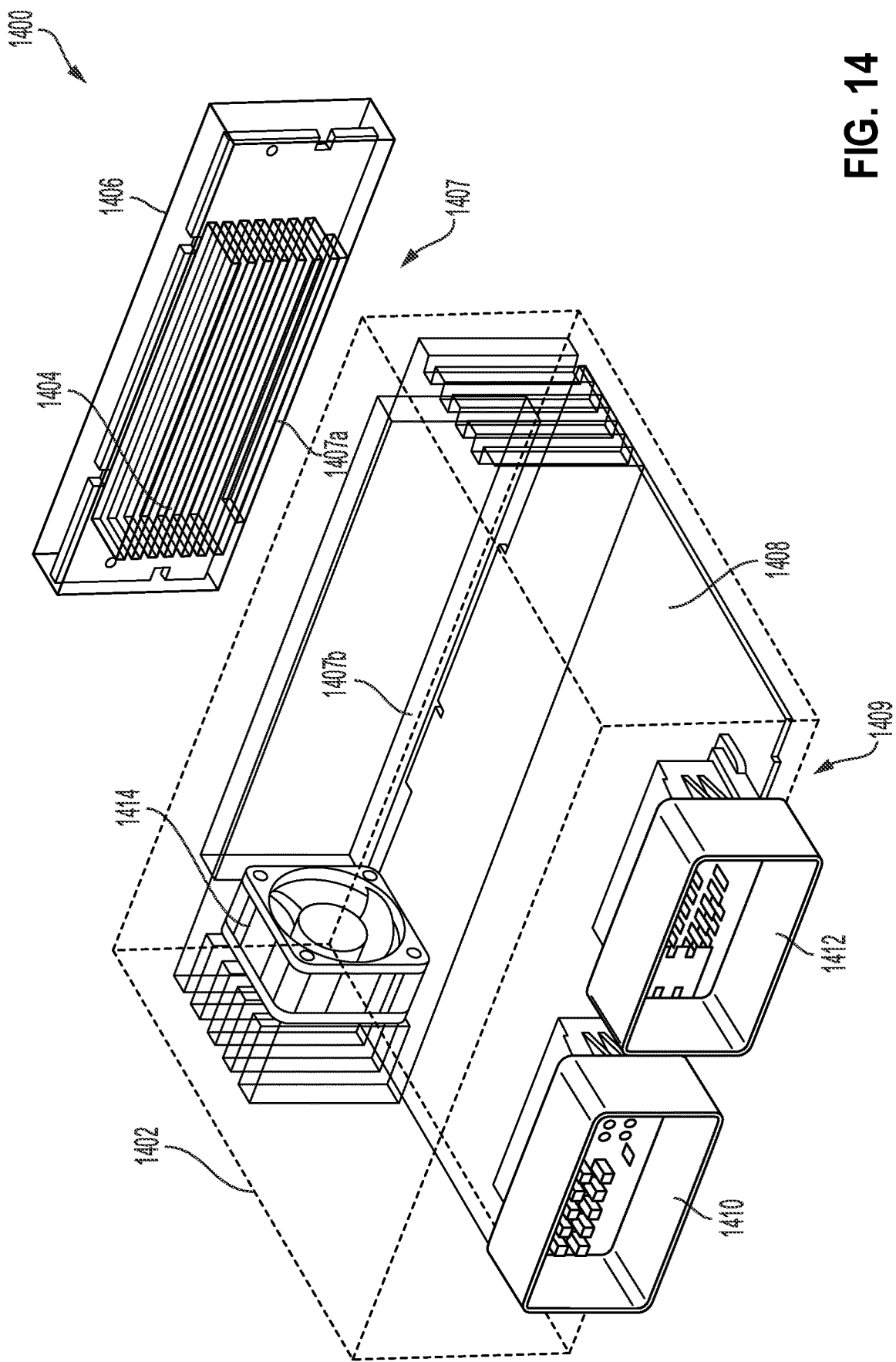
FIG. 14 shows an example of a mechanical configuration of the cockpit domain controller.
Figure 15:
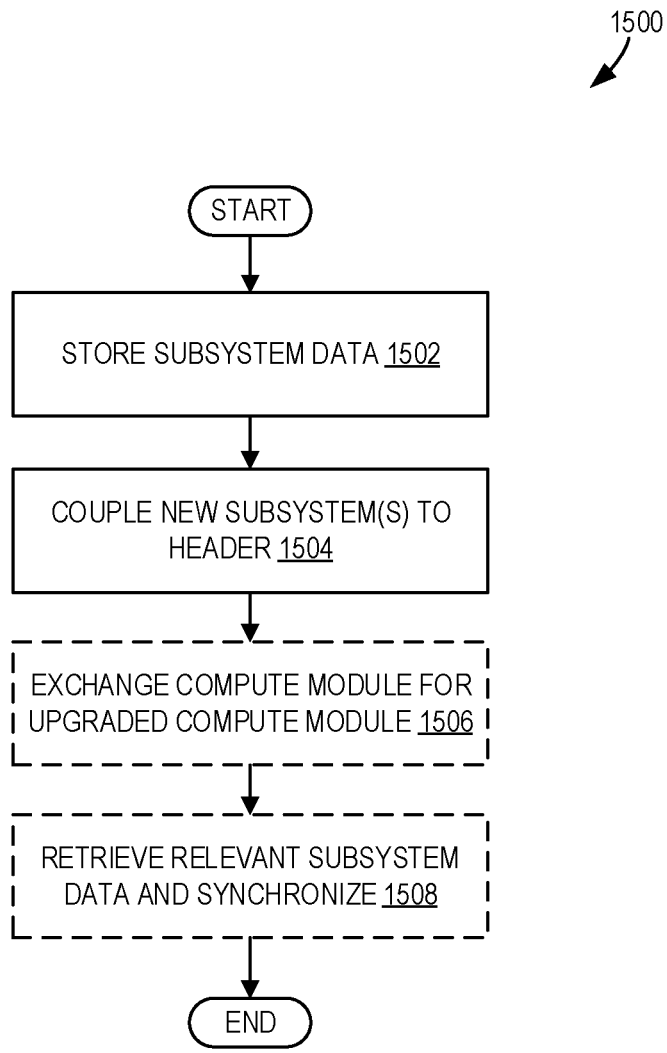
FIG. 15 shows an example of a method for upgrading hardware and/or software of a cockpit domain controller having a scalable connectivity architecture.

An ability of the cockpit domain controller to accommodate additional vehicle subsystems without demanding replacement of the cockpit domain controller or complex coupling of extension devices thereto may be provided by configuring the cockpit domain controller with a scalable connectivity architecture. An example of modular headers included in the scalable connectivity architecture is illustrated in FIG. 9, where the modular headers may enable an increased number of connection interfaces to be incorporated into the cockpit domain controller in a flexible and scalable manner. The scalable connectivity architecture may have an electronic configuration as shown in FIG. 10 to enable a compute module of the cockpit domain controller to communicate with a main circuit board (e.g., mother board) of the cockpit domain controller. Exemplary block diagrams of electromechanical constructions of the compute module are depicted in FIGS. 11-13 to illustrate an adaptability of the scalable connectivity architecture to interface with a range of vehicle subsystems. The scalable connectivity architecture may be incorporated into a mechanical configuration of the cockpit domain controller, as shown in FIG. 14, and a method for upgrading the cockpit domain controller via the scalable connectivity architecture is shown in FIG. 15.

FIG. 1 shows an interior of a cabin 100 of a vehicle 102, in which a driver and/or one or more passengers may be seated. Vehicle 102 may be a road automobile, among other types of vehicles. In particular, vehicle 102 of FIG. 1 may be a motor vehicle including drive wheels (not shown) and a prime mover 104. In some examples, prime mover 104 may be an internal combustion engine. In other examples, prime mover 104 may include both an engine and an electric machine and vehicle 102 may be a hybrid vehicle. For example, vehicle 102 may include a hybrid propulsion system including an energy conversion device, such as the electric machine, operable to absorb energy from vehicle motion and/or the engine and convert the absorbed energy to an energy form suitable for storage by an energy storage device. In another example, vehicle 102 may be a fully electric vehicle, with prime mover 104 configured as the electric machine, and, in some examples, may incorporate fuel cells, solar energy capturing elements, and/or other energy storage systems for powering the vehicle. Further, in some instances, vehicle 102 may be an autonomous vehicle. For example, vehicle 102 may be a fully autonomous vehicle (e.g., fully self-driving vehicle) configured to drive with reduced input from an operator Vehicle 102 may include a plurality of vehicle systems, including a braking system for decreasing vehicle speed, a propulsion system for providing motive power to wheels of the vehicle, a steering system for adjusting a direction of the vehicle, a transmission system for controlling a gear selection for the engine, an exhaust system for processing exhaust gases, and the like. Further, vehicle 102 may include an in-vehicle computing system 109, as shown in FIG. 2.

Referring now to FIG. 2, the in-vehicle computing system 109 includes a cockpit domain controller 280, which is communicatively coupled to other subsystems of the in-vehicle computing system 109 via an interface 282. The interface 282 may comprise a generic interface, usable to communicate with a head-unit 218 including a display 111 and a touch screen 108 (e.g., of FIG. 1). As shown in FIG. 1, the display 111 and the touch screen 108 may be located at a dashboard of vehicle 102, allowing the display 111 and the touch screen 108 to be easily viewed and accessed by a driver or passenger. In some examples, the display 111 and the touch screen 108 may be integrated with (e.g., a part of) the head-unit 218 of FIG. 2. In other examples, the display 111 and the touch screen 108 may be separate from the head-unit 218 and located elsewhere relative to the head-unit 218. Further, in some examples, more than one of the display 111 may be included in vehicle 102 where at least one display may be incorporated into the in-vehicle computing system 109.

In one example, the cockpit domain controller 280 may be modular such that the head-unit 218 may be exchanged with a different head-unit, e.g. during an upgrade, as explained in further detail below with respect to FIGS. 3-5. Additionally, the cockpit domain controller 280 includes a connectivity architecture 283 that includes both hardware and software components for mechanically and communicatively coupling subsystems of the in-vehicle computing system 109 to the cockpit domain controller 280. For example, the connectivity architecture 283 may include one or more headers with connectivity ports, which may be arranged to maximize a number of ports while satisfying packing constrains. The connectivity architecture 283 may also include computing modules for data transmission between the cockpit domain controller 280 and controllers of the subsystems. It will be appreciated that the cockpit domain controller 280 may be a single unit adapted with each of the interface 282, the head-unit 218, and the connectivity 283. In other examples, however, the cockpit domain controller 280 may include more or less of the sub-components shown in FIG. 2, or with various combinations of the sub-components. Further details of the cockpit domain controller 280 are provided further below.

Returning to FIG. 1, an instrument panel 106 may include various displays and controls accessible to a human user (also referred to as the passenger) of vehicle 102. For example, an instrument panel 106 may include an infotainment system such as the touch screen 108 or a video monitor, an audio system control panel, and an instrument cluster 110. The touch screen 108 may receive user input to the head-unit 218 for controlling audio output, visual display output, user preferences, control parameter selection, etc. In some examples, the instrument panel 106 may include an input device for a user to transition the vehicle between an autonomous mode and a non-autonomous mode. In some examples, the instrument panel 106 may include one or more controls for the vehicle control system, such as for selecting a destination, setting desired vehicle speeds, setting navigation preferences (e.g., a preference for highway roads over city streets), and the like. Further still, in some examples, the instrument panel 106 may include one or more controls for driver assistance programs, such as a cruise control system, a collision avoidance system, and the like. Further, additional user interfaces, not shown, may be present in other portions of the vehicle, such as proximate to at least one passenger seat. For example, the vehicle may include a row of back seats with at least one touch screen controlling the in-vehicle computing system 109.

Cabin 100 may also include one or more user objects, such as a mobile device 128, that may be stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system 109 via a communication link 130. The communication link 130 may be wired (e.g., via Universal Serial BUS [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and may be configured to provide two-way communication between the mobile device 128 and the in-vehicle computing system 109. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, sensor subsystem, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

The instrument panel 106 may also be communicatively coupled to additional devices operated and/or accessed by the user but may be located external to vehicle 102, such as one or more external devices 150. In the depicted embodiment, the external devices 150 are located outside of vehicle 102 though it will be appreciated that in alternate embodiments, external devices may be located inside cabin 100. The external devices 150 may include a server computing system, personal computing system, portable electronic device, electronic wrist band, electronic head band, portable music/video player, electronic activity tracking device, pedometer, smart-watch, GNSS system, etc. The external devices 150 may be connected to the instrument panel 106 via a communication link 136 which may be wired or wireless, as discussed with reference to the communication link 130, and configured to provide two-way communication between the external devices and the instrument panel 106.

FIG. 2 shows a block diagram of the in-vehicle computing system 109 configured and/or integrated inside vehicle 102. In-vehicle computing system 109 may perform one or more of the methods described herein in some embodiments. The in-vehicle computing system may include, or be coupled to, various vehicle systems, sub-systems, hardware components, as well as software applications and systems that are integrated in, or able to be integrated into, vehicle 102 in order to enhance an in-vehicle experience for a driver and/or a passenger. Further, the in-vehicle computing system 109 may be coupled to systems for providing autonomous vehicle control.

The in-vehicle computing system 109 may include one or more processors including an operating system processor 214 and an interface processor 220. Operating system processor 214 may execute an operating system on the in-vehicle computing system 109, and control input/output, display, playback, and other operations of the in-vehicle computing system. Interface processor 220 may interface with a vehicle control system 230 via an intra-vehicle system communication module 224.

Intra-vehicle system communication module 224 may output data to vehicle control system 230, while also receiving data input from other vehicle components and systems, e.g. by way of vehicle control system 230. When outputting data, intra-vehicle system communication module 224 may provide a signal via a BUS corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as GNSS sensors, Inertial Measurement System [IMS] etc.), digital signals propagated through vehicle data networks (such as an engine Controller Area Network [May] bus through which engine related information may be communicated, a climate control MAY bus through which climate control related information may be communicated, and a multimedia data network through which multimedia data is communicated between multimedia components in the vehicle).

For example, vehicle data outputs may be output to vehicle control system 230, and vehicle control system 230 may adjust vehicle controls 236 based on the vehicle data outputs. For example, the in-vehicle computing system 109 may retrieve from the engine MAY bus the current speed of the vehicle estimated by wheel sensors, a power state of the vehicle via a battery and/or power distribution system of the vehicle, an ignition state of the vehicle, etc. In addition, other interfacing means such as Ethernet may be used as well without departing from the scope of this disclosure.

A storage device 208 may be included in the in-vehicle computing system 109 to store data such as instructions executable by processors 214 and 220 in non-volatile form. The storage device 208 may store application data, including prerecorded sounds, to enable the in-vehicle computing system 109 to run an application for connecting to a cloud-based server and/or collecting information for transmission to the cloud-based server. The application may retrieve information gathered by vehicle systems/sensors, input devices (e.g., the touch screen 108 within the head-unit 218), data stored in volatile memory 219A or non-volatile storage device (e.g., memory) 219B, devices in communication with the in-vehicle computing system (e.g., a mobile device connected via a Bluetooth link), etc. In-vehicle computing system 109 may further include a volatile memory 219A. Volatile memory 219A may be random access memory (RAM). Non-transitory storage devices, such as the non-volatile storage device 208 and/or non-volatile memory 219B, may store instructions and/or code that, when executed by a processor (e.g., operating system processor 214 and/or interface processor 220), controls the in-vehicle computing system 109 to perform one or more of the actions described in the disclosure.

One or more additional sensors may be included in a sensor subsystem 210 of the in-vehicle computing system 109. For example, the sensor subsystem 210 may include a plurality of sensors for monitoring an environment around the vehicle. For example, the sensor subsystem 210 may include a plurality of cameras 225, one or more radars 226, one or more Lidar(s) 227, and one or more ultrasonic sensors 228. For example, the sensors of sensor subsystem 210 may be used for object detection, such as by an object detection system 232. Sensor subsystem 210 of in-vehicle computing system 109 may communicate with and receive inputs from various vehicle sensors and may further receive user inputs. While certain vehicle system sensors may communicate with sensor subsystem 210 alone, other sensors may communicate with both sensor subsystem 210 and vehicle control system 230, or may communicate with sensor subsystem 210 indirectly via vehicle control system 230.

A microphone 202 may be included in the in-vehicle computing system 109 to measure ambient noise in the vehicle, to measure ambient noise outside the vehicle, etc. One or more additional sensors may be included in and/or communicatively coupled to sensor subsystem 210 of the in-vehicle computing system 109. Sensor subsystem 210 of in-vehicle computing system 109 may communicate with and receive inputs from various vehicle sensors and may further receive user inputs. While certain vehicle system sensors may communicate with sensor subsystem 210 alone, other sensors may communicate with both sensor subsystem 210 and vehicle control system 230, or may communicate with the sensor subsystem 210 indirectly via vehicle control system 230. Sensor subsystem 210 may serve as an interface (e.g., a hardware interface) and/or processing unit for receiving and/or processing received signals from one or more of the sensors described in the disclosure.

A navigation subsystem 211 of in-vehicle computing system 109 may generate and/or receive navigation information such as location information (e.g., via a GNSS/IMS sensor 204 and/or other sensors from sensor subsystem 210), route guidance, traffic information, point-of-interest (POI) identification, and/or provide other navigational services for the user. Navigation sub-system 211 may include inputs/outputs 270, including analog to digital converters, digital inputs, digital outputs, network outputs, radio frequency transmitting devices, etc. In some examples, navigation sub-system 211 may interface with vehicle control system 230.

External device interface 212 of in-vehicle computing system 109 may be coupleable to and/or communicate with one or more external devices 150 located external to vehicle 102. While the external devices are illustrated as being located external to vehicle 102, it is to be understood that they may be temporarily housed in vehicle 102, such as when the user is operating the external devices while operating vehicle 102. In other words, the external devices 150 are not integral to vehicle 102. The external devices 150 may include a mobile device 128 (e.g., connected via a Bluetooth, NFC, WIFI direct, or other wireless connection) or an alternate Bluetooth-enabled device 252. Mobile device 128 may be a mobile phone, smart phone, wearable devices/sensors that may communicate with the in-vehicle computing system via wired and/or wireless communication, or other portable electronic device(s). Other external devices include external services 246 and external storage devices 254, such as solid-state drives, pen drives, USB drives, cloud storage space, etc. External devices 150 may communicate with the in-vehicle computing system 109 either wirelessly or via connectors without departing from the scope of this disclosure. For example, external devices 150 may communicate with in-vehicle computing system 109 through the external device interface 212 over network 260, a universal serial BUS (USB) connection, a direct wired connection, a direct wireless connection, and/or other communication link.

The external device interface 212 may provide a communication interface to enable the in-vehicle computing system to communicate with mobile devices associated with contacts of the user. For example, the external device interface 212 may enable voice calls to be established and/or text messages (e.g., SMS, MMS, etc.) to be sent (e.g., via a cellular communication network) to the mobile device 128 associated with a contact of the user. Further, in some examples, a vehicle user may adjust autonomous vehicle operation via an application of the mobile device 128 associated with the user. The external device interface 212 may additionally or alternatively provide a wireless communication interface to enable the in-vehicle computing system 109 to synchronize data with one or more devices in the vehicle (e.g., the user's mobile device) via WIFI direct.

One or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the user, vehicle, and environment and perform an action based on the context (e.g., requesting/sending data to other devices).

The in-vehicle computing system 109 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system 109 may receive positioning signals such as GNSS signals via one or more antennas 206. The in-vehicle computing system 109 may also receive wireless commands via FR such as via antenna(s) 206 or via infrared or other means through appropriate receiving devices. For example, antenna 206 may receive voice calls (e.g., such as telephone calls). Additionally, antenna 206 may provide AM/FM radio signals to external devices 150 (such as to mobile device 128) via external device interface 212.

Vehicle control system 230 may include vehicle controls 236 for controlling aspects of various vehicle systems. For example, vehicle controls 236 includes steering control system 238, braking control system 240, and acceleration control system 242. Vehicle controls 236 may include additional control systems. In some example, vehicle controls 236 may be operated autonomously, such as during autonomous vehicle operation. In other examples, vehicle controls 236 may be controlled by a user. Further, in some examples, a user may primarily control vehicle controls 236, while a variety of driver assistance programs may intermittently adjust vehicle controls 236 in order to increase vehicle performance.

Braking control system 240 may be configured to control an amount of braking force applied to the vehicle. For example, during a non-autonomous mode of operation, braking control system 240 may be controlled by a brake pedal. During an autonomous mode of operation, braking control system 240 may be controlled autonomously. For example, the vehicle control system 230 may determine that additional braking is requested, and may apply additional braking.

Acceleration control system 242 may be configured to control an amount of acceleration applied to the vehicle. For example, during a non-autonomous mode of operation, acceleration control system 242 may be controlled by an acceleration pedal. During an autonomous mode of operation, acceleration control system 242 may be controlled by vehicle control system 230. In some examples, a driver assistance system may adjust acceleration control system 242 or vehicle control system 230 may depress the acceleration pedal in order to accelerate the vehicle.

Steering control system 238 may be configured to control a direction of the vehicle. For example, during a non-autonomous mode of operation, steering control system 238 may be controlled by a steering wheel. For example, the user may turn the steering wheel in order to adjust a vehicle direction. During an autonomous mode of operation, steering control system 238 may be controlled by vehicle control system 230. In some examples, a driver assistance system may adjust steering control system 238.

Vehicle control system 230 includes object detection system 232 for detecting objects. For example, object detection system 232 may receive sensor data from sensor subsystem 210 via intra-vehicle system communication module 224, and may identify objects in the environment surrounding the vehicle, such as traffic lights, other vehicles, pedestrians, and the like. The outputs of object detection system 232 may be used for a variety of systems, such as for adjusting vehicle controls 236, for notifying a user of an object, for autonomous vehicle control, for driver assistance systems, and the like.

In particular, object detection system 232 may include a neural network 234. Neural network 234 may be a convolutional neural network (CNN) trained on sensor data to detect and identify objects. As one example, object detection system 232 may employ a You Only Look Once (YOLO) framework for detecting and identifying objects via the neural network 234. In other examples, object detection system 232 may use other object detection frameworks, such as Spatial Pyramid Pooling (SPP), Faster R-CNN (FRCN), Region Proposal Network (RPN), a Fully Convolutional Network (FCN), Batch Normalization (BN), deconvolutional layers, and the like.

The cockpit domain controller 280 may enable user control over subsystems and accessories of the vehicle, both within the in-vehicle computing system 109 and communicatively connected to the in-vehicle computing system 109. For example, the interface 282 may provide electrical hardware interfaces for mechanically connecting the head-unit 218 thereto, which provides communicative coupling of the head-unit 218 to a central controller of the in-vehicle computing system 109, such as operating system processor 214. The touch screen 108 of the head-unit 218 allows the user to input information and preferences, e.g., choose audio settings, radio stations, playlists, etc., while the display 111 provides a visual presentation of control options and current statuses and settings of the cockpit domain controller 280. In a conventional cockpit domain controller 280, user-defined data may be at the head-unit 218.

In some instances, replacement of the head-unit 218 may be desired. For example, an updated head-unit providing additional subsystem options, e.g., connectivity to additional audio systems and other accessory and/or auxiliary systems, may replace the head-unit 218. However, the user-defined data associated with the head-unit 218 (e.g., the original head-unit) may be lost. In one example, this issue may be addressed by storing the user-defined data in an external server or on-board memory, such as at storage device 208, or at a remote location, such as a cloud platform. Upon installation of the updated head-unit, the data from the external server or on-board memory may be downloaded to the updated head-unit, thereby providing a seamless experience for the user. Further details of data transfer and storage are provided below with reference to FIG. 3.

As described above, the cockpit domain controller 280 also includes the connectivity architecture 283 which may allow the cockpit domain controller 280 to accommodate incorporation of additional subsystems into the vehicle. For example, the user may desire coupling of premium audio services to the vehicle, which may demand both a mechanical and communicative connection of a device providing the premium audio services to the cockpit domain controller 280. In one example, the connectivity architecture 283 may be scalable such that a number of devices and/or subsystems coupled to the connectivity architecture 283 may be readily varied without demanding modifications to the architecture. In other words, the connectivity architecture 283 provide flexible connectivity of the cockpit domain controller 280, maximizing a number of interfaces for connections while standardizing the interfaces such that communicative coupling is enabled across a variety of formats and protocols. A scalable connectivity architecture is also depicted in FIG. 3.

FIG. 3 shows a block diagram of a cockpit domain controller 300. The cockpit domain controller 300 comprises a head-unit 340 communicatively coupled to an interface 302 via a networking connection 322 and a plurality of reconfigurable inputs/outputs 324. In one example, the cockpit domain controller 300 may be the cockpit domain controller 280 of FIG. 2. The networking connection 322 is usable to transmit authentication data, user settings, and input/output configuration data back and forth between the interface 302 and the head-unit 340. In some examples, the networking connection 322 may be established through the reconfigurable inputs/outputs 324. The networking connection may comprise, for example, an Ethernet or USB connection, although other types of connections are possible.

The interface 302 may be an embodiment of the interface 282 of FIG. 2 and the head-unit 340 may be an embodiment of the head-unit 218 of FIG. 2. As described with respect to FIG. 2 above, the head-unit 340 is usable to facilitate interactivity between a user and an infotainment system. The interface 302 is configured to route a number of connections between the head-unit 340 and the broader infotainment system, including audio connections, video connections, connections to antennas (e.g. the FM radio antenna), and more. The connections are routed via the reconfigurable inputs/outputs 324, which may be reconfigured according to input/output configuration data transmitted from the head-unit 340, as explained in further detail below.

To facilitate the user interface, the head-unit 340 may include a display 342 and/or a touch screen 344, which are usable to generate one or more user menus, sounds, and other user interface elements. The display 342 may be an example of the display 111 of FIGS. 1 and 2, and the touch screen 344 may be an example of the touch screen 108 of FIGS. 1 and 2.

The head-unit 340 includes both a processor 354 and a non-transitory memory 360. The processor 354 is usable to perform computations, including audio processing computations (e.g. on media selected by the user) and one or more executable programs. Non-transitory memory may comprise volatile and/or nonvolatile memory, including random access memory (RAM) and/or read-only memory (ROM). The non-transitory memory 360, as described below, is usable to store machine-executable instructions, store a collection of user preferences, and store authentication data.

The non-transitory memory 360 of the head-unit 340 further contains user settings 362, input/output configuration data 364, and authentication data 366. The user settings 362 may comprise, for example, sound processing preferences, the layout and/or relative volume of one or more speakers (e.g. "audio image"), a list of Bluetooth connections, login information for one or more infotainment streaming services, and more. The user settings may be stored in a persistent manner, e.g., maintained available and accessible despite hardware variations and modifications, within the non-transitory memory 360 and may be transmissible to the interface 302 via the networking connection 322.

The reconfigurable inputs/outputs 324 further contain a number of connectors 326, which may comprise, for example, a number of metal tabs, coaxial connectors, or virtually any other mechanism usable to electrically couple the interface 302 and the head-unit 340. The number, arrangement, and electrical properties (e.g. input/output impedance, maximum current, operating voltage, etc.) of the connectors 326 may be standardized such that the head-unit 340 may be swapped for a different head-unit while maintaining and not physically modifying the connectors 326 even after inputs and/or outputs have been reconfigured. Although the physical arrangement of the connectors 326 may not change when a head-unit is replaced, the usage of the connectors 326 may change according to a software mapping stored within the head-unit 340. For example, a first head-unit may include a first software mapping specifying audio output through two channels, with each channel allocated to one of the connectors 326. If the first unit is replaced with a second head-unit having a second software mapping specifying audio output through four audio channels (again, with each channel using one of the connectors 326), the reconfigurable inputs/outputs 324 may be reconfigured to accommodate the second head-unit's increased usage of the connectors 326. As explained below, reconfiguration of the reconfigurable inputs/outputs 324 is performed using resources available to the interface 302. Reconfiguration of the reconfigurable inputs/outputs 324 does not physically change the reconfigurable inputs/outputs.

Usage of the reconfigurable inputs/outputs 324 is performed according to input/output configuration data 364 stored within the non-transitory memory 360 of the head-unit 340. The input/output configuration data 364 comprises a list of inputs/outputs usable by the head-unit 340 to communicate with the interface 302. The input/output configuration data 364 therefore includes information about the usage of each of the connectors 326 used to transmit data to and from the interface 302 and the head-unit 340. In some examples, the input/output configuration data 364 may include configuration data usable to modify and/or establish the networking connection 322.

The non-transitory memory 360 of the head-unit 340 further includes authentication data 366. The authentication data 366 may comprise an identification number and/or authorization data stored according to other means. The authentication data 366 is transmissible to the interface 302 (e.g. via the networking connection 322), which, as explained below, may verify the authentication data 366 of the head-unit 340. As explained below, in the event of successful authentication, the head-unit 340 may connect to the interface 302. The authentication data 366 may be stored within read-only memory (ROM), thereby preventing tampering with the authentication data 366. In some examples, the authentication data may include a cryptographic algorithm specific to the head-unit 340, whose output may be checked against a list of authorized authentication data, as explained in further detail below.

As explained above, the interface 302 is configured to transmit signals between the head-unit 340 and other components of the in-vehicle computing system. The interface 302 therefore includes its own collection of computing resources, including a processor 306, which is usable to execute machine-readable instructions, including computations related to communication between the head-unit and the interface 302, performing authentication communications, and more. The processor 306 of the interface 302 may be disposed within the interface 302 itself, e.g., as an electronic component therein, or disposed within some remote server, which may be further communicatively coupled to the interface.

To store data and machine-executable instructions, the interface 302 includes a non-transitory memory 308. The non-transitory memory 308 may comprise, for example, flash storage, RAM, ROM, or any other volatile and/or non-volatile store devices usable to store digital data. The non-transitory memory 308 of the interface 302 is configured to store executable instructions for performing authentication of a head-unit (e.g. head-unit 340), reconfiguring the reconfigurable inputs/outputs 324, and storing the user settings of the head-unit 340.

The non-transitory memory 308 further includes a user settings transfer module 310, which is configured to request (e.g. via the networking connection 322) the user settings 362 from the head-unit 340. Upon receiving the request, the head-unit 340 may transfer a copy of its user settings 362 via the networking connection 322, to the interface 302 where the copy of the user settings may be stored within the user settings storage 312. The process of transferring the user settings 362 from the head-unit 340 to the user settings storage 312 may be initiated, for example, by a technician in the event that the head-unit 340 is being replaced with another head-unit. The user settings storage 312 is therefore usable to provide the stored user settings to another head-unit, e.g. a new head-unit attached to the interface 302 after the head-unit 340 is disconnected.

The non-transitory memory 308 includes a configuration module 314, which is usable to retrieve input/output configuration data 364 from the head-unit 340 (e.g. via the networking connection 322) to reconfigure the reconfigurable inputs/outputs 324 according to the input/output configuration data 364 obtained from the head-unit 340. For example, the interface 302, using the input/output configuration data 364, may route audio data sourced from the head-unit 340 to one or more speakers (e.g. speakers 112 of FIG. 1) within the infotainment system via channels defined by the input/output configuration data 364.

The non-transitory memory 308 includes an authentication module 316, which is usable to authenticate head-units, e.g. head-unit 340. The authentication module 316 may authenticate a head-unit, for example, through first retrieving authentication data 366 from the head-unit and checking it against a pre-defined list of authorized authentication data. The pre-defined list of authorized authentication data may be sourced, for example, from an external database 320, which may be accessible to the interface 302 via a connection to the Internet or from a local connection. The pre-defined list of authorized authentication data may be checked such that it is sufficiently up-to-date. In the event that the pre-defined list of authorized authentication data is out of date (which may be checked, for example, through the use of a real-time clock), the interface may request and obtain an updated list.

In the event that the authentication data 366 from the head-unit 340 is determined to be invalid, e.g. if the authentication data 366 is not included within the pre-defined list of authorized authentication data, the interface 302 may reject the connection to the head-unit 340. Rejection of the connection may comprise, for example, configuring all reconfigurable inputs/outputs 324 such that no data can be transmitted through the reconfigurable inputs/outputs 324, thereby disabling access of the unauthorized head-unit to other components of the infotainment system. In some examples, the networking connection 322 may be used to transmit a notification detailing the lack of authorization. The notification may be displayed, for example, using text displayable on the display 342. The process of switching from a first head-unit to a second head-unit is detailed in FIG. 4.

The cockpit domain controller 300 further includes a scalable connectivity architecture 370, which may moderate a connectivity of the cockpit domain controller 300 to vehicle subsystems, such as audio subsystems, a navigation subsystem, a microphone, video subsystems, etc. The scalable connectivity architecture 370 may allow the cockpit domain controller 300 to operate as a modular hub that provides transfer of data between the interface 302, based on input received at the head-unit 340, and a central controller of the vehicle monitoring the subsystems. The scalable connectivity architecture 370 may be implemented at one or more headers of the cockpit domain controller, as shown in FIGS. 9 and 14, where each of the header includes connection ports arranged in an optimized and efficient manner. The scalable connectivity architecture 370 may have an electronic configuration including power management devices, such as power management integrated circuits (PMICs), at least one microcontroller, and a system-on-chip (SOC). An embodiment of the electronic configuration of the scalable connectivity architecture is shown in FIG. 10 and described further below.

FIG. 4 shows a method 400 executable by a cockpit domain controller to switch from a first head-unit to a second head-unit, such as when the second head-unit replaces the first head-unit at the cockpit domain controller. For example, the cockpit domain controller may be the cockpit domain controller 300 of FIG. 3. Method 400 is executable by one or more computing devices within an interface connecting a head-unit to a vehicle infotainment system, e.g., the interface 302 of FIG. 3. Method 400 includes steps to request data from both the first and second head-units where the data may be transmitted through a networking connection, e.g., the networking connection 322 of FIG. 3. Method 400 may include storing user data from the first head-unit, authenticating the second head-unit, and configuring the second head-unit according to the user data from the first unit as well as input/output configuration data from the second unit, as explained in detail further below. In some examples, method 400 may be invoked by a technician performing a head-unit replacement. It is assumed that at the start of method 400, a functional networking connection, such as the networking connection 322 of FIG. 3, between the interface and the first head-unit is present. A communications diagram showing example communications between the first head-unit, second head-unit, interface, and an external database during the execution of method 400 is shown in FIG. 7 and described further below.

At 402, method 400 includes obtaining an authentication data list. The authentication data list may be obtained from an external database, e.g. external database 320 of FIG. 3. The external database may be hosted on the Internet, or may be transferrable to the interface via offline storage (e.g. a USB drive). The authentication data list comprises a predefined list of authorized head-units. In the event that new authorized head-units are developed, authentication data for the new authorized head-units may be added to the most recent authentication data list, e.g. the version of the list hosted on the external database. The authentication data list obtained from the external database may be stored within non-transitive memory of the interface and is further usable to check the authentication of the second head-unit, as explained in further detail below.

At 404, method 400 includes storing user preferences in memory. The user preferences may include, for example, a list of external devices and protocols used to connect to those external devices, e.g. a list of Bluetooth connections, a list of WLAN connections, and so on. User preferences may further include login information for one or more online services, e.g. music streaming services and/or GNSS navigation services. Storing user preferences in memory comprises requesting the user preferences from the first head-unit via the networking connection. In response, the first head-unit is configured to use the networking connection to transmit the user preferences.

At 406, method 400 includes disconnecting the first head-unit. The first head-unit may be disconnected by a technician, e.g. through physically and electrically disconnecting the first head-unit from the interface. The first head-unit may be removed from a slot where it attaches to the interface. Disconnection may be detected, for example, through monitoring the reconfigurable inputs/outputs and/or the networking connection between the interface and the first head-unit. For example, a current used to power the first head-unit may abruptly stop flowing through the first head-unit, signifying a disconnection.

At 408, method 400 includes establishing a networking connection with the second head-unit. The networking connection may be established through a networking protocol, such as TCP/IP, for example. In some examples, the networking connection may be established via electrical connection to one or more connectors (e.g. the connectors 326 of FIG. 3) of the reconfigurable inputs/outputs.

At 410, method 400 includes checking authentication of the second head-unit.

The authentication data may be obtained from the second head-unit, upon which it may be stored, e.g. as authentication data 366. Authentication data may be transmitted via the networking connection established at 408. The authentication data is checked against the authentication list obtained at 402. If the authentication data is included within the authentication data list, the second head-unit is said to be authorized. Otherwise, the second head-unit is assumed to be unauthorized. Method 400 branches at 412 depending on whether or not the second head-unit is authorized. If the second head-unit is authorized, method 400 proceeds to 416. Otherwise, method 400 proceeds to 418.

At 416, method 400 includes reconfiguring the inputs/outputs. Reconfiguring the inputs and outputs may be performed according to the input/output configuration data obtained from the second head-unit, e.g., through the use of the networking connection. Reconfiguring the inputs/outputs may include the activation, deactivation, and/or repurposing of one or more connectors within the reconfigurable inputs/outputs. The reconfigured inputs/outputs are then usable by the second head-unit to transmit data to (and receive data from) other components of the entertainment system, including speakers, radio antennas, and more. Physical interfaces for the inputs and/or outputs are maintained and not physically modified even after inputs and/or outputs have been reconfigured. Reconfiguration of the inputs/outputs is discussed in greater detail with respect to FIG. 6.

At 418, method 400 includes downloading user settings to the second head-unit. The user settings are sourced from the memory of the interface, and may comprise those user settings originally obtained from the first head-unit at 404. The user settings may be downloaded to the second head-unit via the networking connection. User settings downloaded to the second head-unit may be immediately used to inform the operation of the second head-unit, including, for example, sound processing preferences, Bluetooth connection preferences, user login data for one or more infotainment streaming services, and more. Method 400 ends, allowing the second head-unit to resume or begin normal operation.

If the second head-unit is not determined to be authorized at 412, method 400 proceeds to 420, where method 400 may include disabling at least some of the reconfigurable inputs/outputs. Some of the reconfigurable inputs/outputs may be disabled for the unauthorized second head-unit such that the second head-unit is electrically isolated from components of the vehicle infotainment system outside of the interface. Therefore, if the second head-unit is not authorized by the manufacturer of the interface, the second head-unit will not be able to generate output (or receive input) from components such as radio antennas or speakers. The networking connection and power to the second head-unit may be maintained.

At 422, method 400 includes transmitting a notification to the unauthorized second head-unit. The notification is transmissible through the networking connection. In some examples, the notification may be displayed on the screen of the unauthorized second head-unit, e.g. as text appearing on its display. The text may say display a message such as "Error: unauthorized head-unit." Method 400 ends.

In addition to installing and authenticating the second head-unit, configuring the second head-unit to be communicatively coupled to the interface of the cockpit domain controller may be demanded. FIG. 5 shows a method 500 executable by a cockpit domain controller to establish communication between an interface and a head-unit, where the head-unit may be an original head-unit, e.g., installed during vehicle assembly, or a new head-unit replacing the original head-unit. In one example, the cockpit domain controller may be the cockpit domain controller 300 of FIG. 3. Method 500 is executable by one or more computing devices within an interface connecting a head-unit to a vehicle infotainment system, e.g., the interface 302 of FIG. 3. Method 500 includes steps to request data from a head-unit which may be transmitted through a networking connection, e.g. networking connection 322 of FIG. 3, to authenticate the head-unit and to configure a number of inputs/outputs within the interface according to input/output configuration data sourced from the head-unit. As an example, method 500 may be invoked by a technician installing the head-unit. A communications diagram showing example communications between the head-unit, the interface, and an external database during the execution of method 500 is shown in FIG. 8 and described further below.

At 502, method 500 includes obtaining an authentication data list. The authentication data list may be obtained from an external database, e.g. external database 320. The external database may be hosted on the Internet, or may be transferrable to the interface via offline storage (e.g. a USB drive). The authentication data list comprises a pre-defined list of authorized head-units. In the event that new authorized head-units are developed, authentication data for the new authorized head-units may be added to the most recent authentication data list, e.g. the version of the list hosted on the external database. The authentication data list obtained from the external database may be stored within non-transitive memory of the interface and is further usable to check the authentication of the head-unit, as explained in further detail below.

At 504, method 500 includes establishing a networking connection with the head-unit. The networking connection may be established through a networking protocol, such as TCP/IP, for example. In some examples, the networking connection may be established via electrical connection to one or more connectors (e.g. connectors 326 of FIG. 3) of the reconfigurable inputs/outputs.

At 506, method 500 includes checking authentication of the head-unit. The authentication data may be obtained from the head-unit upon which it may be stored, e.g., as authentication data 366 of FIG. 3. Authentication data may be transmitted via the networking connection established at 504. The authentication data may be verified against the authentication list obtained at 502. If the authentication data is included within the authentication data list, the head-unit is said to be authorized. Otherwise, the head-unit is assumed to be unauthorized. Method 500 branches at 508 depending on whether or not the head-unit is authorized. If the head-unit is authorized, method 500 proceeds to 512. Otherwise, method 500 proceeds to 514.

At 512, method 500 includes reconfiguring the inputs/outputs. Reconfiguring the inputs and outputs may be performed according to the input/output configuration data obtained from the head-unit, e.g., through the use of the networking connection. For example, the head-unit may utilize downloaded reconfigured settings. Reconfiguring the inputs/outputs may include the activation, deactivation, and/or repurposing of one or more connectors within the reconfigurable inputs/outputs. The reconfigured inputs/outputs are then usable by the head-unit to transmit data to (and receive data from) other components of the infotainment system, including speakers, radio antennas, and more. Physical interfaces for the inputs and/or outputs are maintained and not physically modified even after inputs and/or outputs have been reconfigured. Reconfiguration of the inputs/outputs is discussed in greater detail with respect to FIG. 6 below.

If the second head-unit is not determined to be authorized at 508, method 500 proceeds to 514, where method 500 may include disabling some of the reconfigurable inputs/outputs. Some of the reconfigurable inputs/outputs may be disabled for the unauthorized head-unit such that the second head-unit is electrically isolated from components of the vehicle infotainment system outside of the interface. Therefore, if the head-unit is not authorized by the manufacturer of the interface, the head-unit will not be able to generate output (or receive input) from components such as radio antennas or speakers. The networking connection and power to the head-unit may be maintained.

At 516, method 500 includes transmitting a notification to the unauthorized head-unit. The notification is transmissible through the networking connection. In some examples, the notification may be displayed on the screen of the unauthorized head-unit, e.g. as text appearing on its display. The text may display a message such as "Error: unauthorized head-unit." Method 500 ends.

FIG. 6 shows a method 600 for reconfiguring a number of reconfigurable inputs/outputs (e.g. the reconfigurable inputs/outputs 324) in an interface (e.g. interface 302). Method 600 may be stored within the non-transitory memory (e.g. the non-transitory memory 308), and represents an example method stored within a configuration module, such as the configuration module 314. Method 600 is executable through the use of a processor, such as processor 306.

As explained above with respect to FIG. 4 and FIG. 5, method 600 is executed in the event that the head-unit is authorized. At various points, method 600 includes data transfer to and from an authorized head-unit, e.g., the head-unit 340 of FIG. 3. Method 600 may be executed as a subroutine during either method 400 or method 500, e.g. at 416 and/or at 512. If method 600 is invoked by method 400, the authorized head-unit of method 600 comprises the second head-unit described with respect to method 400. If invoked during method 500, the authorized head-unit of method 600 represents the head-unit described by method 500. In one example, the second head-unit of method 500 may be the same as the head-unit of method 600. The authorized head-unit may be communicatively coupled to the interface via the networking connection.

Method 600 may also be initiated in response to various events, including a period event timer, user request for reconfiguration, etc. The method may be initiated even though a head-unit is not replaced. In another example, the event may include that the interface and/or head-unit experiences a reset/memory loss. A reset may be initiated, for instance, to debug the interface and/or head-unit and/or to reset the interface and/or head-unit, such as in the event that the vehicle is being resold, serviced, etc. Resetting of the interface and/or head-unit may, in some instances, erase any user data and any configuration data stored within the interface and/or head-unit. In the event of a reset, the interface may reconfigure its inputs/outputs according to the features of the already present head-unit, which may also have been reset.

In another example, if the head-unit is reset or returned to factory settings, the interface may initiate a reconfiguration. In still another example, the reconfiguration is based on the head-unit detected, which may be an already present head-unit or a replaced head-unit. In still another example, during initial vehicle assembly and/or initial installation, the interface may have a default configuration that is verified upon initial connection with a head-unit, and then re-configured based on the initial connection and identification of the head-unit. For example, in some cases, head-units may be upgraded in small batches or even mid-production, and thus even though it may be a first installation the interface may, upon initial detection to a head-unit, perform the described process as an initial configuration. The initial configuration may re-configure a default mapping used when initially producing the interface, or the interface may not be configured with an initial configuration and thus may be initially configured upon connection with the head-unit during vehicle build.

At 602, method 600 includes obtaining input/output configuration data from the authorized head-unit. This comprises sending a request to the authorized head-unit, e.g. through the networking connection. Upon receipt of the request, the authorized head-unit is configured to transmit input/output configuration data, e.g. input/output configuration data 364.

At 606, method 600 includes storing the input/output configuration data in memory. The input/output configuration data may be stored in nonvolatile memory, e.g. flash memory and/or the memory of a hard disk drive (HDD), or in the cloud (e.g., a global network of remote servers). For example, the input/output configuration data may be stored at the non-transitory memory 308 of FIG. 3, and/or storage device 208 of FIG. 2. Storage of the input/output configuration data in nonvolatile memory allows for persistent usage of the input/output configuration data, e.g., in the event that the interface loses power and reboots. Therefore, the input/output configuration data does not need to be obtained from the authorized head-unit each time the interface and head-unit are powered.

At 608, method 600 includes reconfiguring the inputs/outputs. The inputs/outputs may be reconfigured according to the input/output configuration data stored in memory. Reconfiguring the inputs/outputs may include the activation, deactivation, and/or repurposing of one or more connectors within the reconfigurable inputs/outputs. The reconfigured inputs/outputs are then usable by the authorized head-unit to transmit data to (and receive data from) other components of the infotainment system, including speakers, radio antennas, and more. Physical interfaces (e.g. connectors, such as connectors 326 of FIG. 3) for the inputs and/or outputs may be maintained and not physically modified even after inputs and/or outputs have been reconfigured.

At 610, method 600 includes allowing the authorized head-unit to transmit and receive data via the inputs/outputs. The inputs/outputs, configured at 608, may be used to electrically couple the head-unit to the other subsystems within the infotainment system, as described above. Data transmitted by the head-unit may include a number of digital and/or analog signals, including the transmission of speaker signals and the receiving of FM radio signals. Method 600 returns, allowing either method 400 or method 500 to continue.

FIG. 7 shows a communication diagram 700. Diagram 700 shows the communication between four devices: a first head-unit 702, an interface 704, a second head-unit 706, and an external database 708. The first head-unit 702 and the second head-unit 706 are each examples of the head-unit 340 of FIG. 3, but may have different features. For example, the head-units may both have connectors enabling connectivity to the interface 704 but may have different quantities and/or types of connectors to couple the respective head-units to different sets of subsystems. The interface 704 is an example of the interface 302, and the external database 708 is an example of the external database 320. The example communication in diagram 700 is a non-limiting example of the communication between the four devices as would occur during the execution of method 400. Time is represented by the direction of a vertical axis 701. Within diagram 700, tails of arrows represent the origin of a message and the heads of arrows represent the destination of a message.

The example diagram 700 includes a first phase 710, during which the first head-unit 702 is configured to send its user settings (e.g. user settings 362 of FIG. 3) to the interface and power off. First phase 710 represents an example of storing user settings in memory at 404 and disconnecting the first head-unit at 406. The first phase 710 is initiated by the first head-unit 702 when it sends a disconnection message 712 signifying a user intent to disconnect the first head-unit 702 from the interface 704. In response, the interface 704 sends a backup request message 714, which requests user settings (e.g. the user settings of the first head-unit 702). The first head-unit 702 responds by transmitting user settings 716 to the interface 704.

Upon receipt of the user settings 716, the interface 704 stores the user settings 716 within memory. Upon successful receipt and storage of the user settings 716, the interface 704 sends a confirmation and power off signal 717, which prompts the first head-unit 702 to close the networking connection between the first head-unit 702 and the interface 704. At 718, a technician may remove the first head-unit 702, fully electrically disconnecting it from the interface 704. The second head-unit 706 may be connected to the interface 704, allowing the two to communicatively couple, e.g., via a networking connection.

The example diagram 700 includes a second phase 720, during which the interface 704 establishes communications and authorizes the second head-unit 706 according to a list of authorization data stored on the external database 708. The second phase 720 is initiated by the interface 704 when the interface 704 sends an authorized authentication data list request 722 to the external database 708. In some examples, communication between the external database 708 and the interface 704 may be sustained through the use of an Internet connection, e.g. via wireless or wired connectivity. The external database 708 responds to the authorized authentication data list request 722 by sending an authorized authentication data list 724 to the interface 704.

As explained above with respect to FIGS. 3, 4, and 5, the authorized authentication data list 724 is usable to check whether or not the second head-unit 706 is authorized. To this end, the interface 704 sends an authentication request 726 to the second head-unit 706. The authentication request 726 is a request for the authentication data of the second head-unit, e.g. authentication data 366. The second head-unit sends authentication data 728 to the interface 704. The authentication data 728 is checked against the authorized authentication data list 724, allowing for the interface 704 to determine whether or not the second head-unit 706 is authorized. If the second head-unit 706 is authorized, the interface 704 sends an authentication code 730 to the second head-unit 706. In the example described in diagram 700, the second head-unit 706 is determined to be authorized. Were the second head-unit 706 not to be authorized, the interface 704 would instead send a notification to the second head-unit 706 detailing that it is not authorized.

Assuming the second head-unit 706 is authorized, communication proceeds to a third phase 740, during which the second head-unit 706 is set up. The third phase 740 starts when the interface 704 sends an input/output configuration data request 742 to the second head-unit 706. In response, the second head-unit 706 is configured to send its input/output configuration data 744, which is an example of input/output configuration data 364 of FIG. 3. The input/output configuration data 744 is usable by the interface 704 to reconfigure the inputs/outputs according to the specifications of the second head-unit 706. This may comprise adjusting which connectors within the inputs/outputs are connected to corresponding connectors on the second head-unit 706. After reconfiguring the inputs/outputs, the second head-unit 706 is allowed to electrically couple to various subsystems of the vehicle infotainment system to the second head-unit 706. Physical interfaces for the inputs and/or outputs are maintained and not physically modified even after inputs and/or outputs have been reconfigured.

After reconfiguring its inputs/outputs, the interface 704 sends user settings 746 to the second head-unit 706. The user settings 746 are the user settings 716 obtained from the first head-unit 702. The second head-unit 706 is configured to save the user settings 746 in memory, allowing a user to access user settings from the first head-unit 702 after the replacement of the first head-unit 702. Upon successful receipt and storage of the user settings 746, the second head-unit 706 sends a confirmation message 748 to the interface 704.

The confirmation message 748 initiates a fourth phase 750, during which the second head-unit 706 is configured to transmit infotainment output data 754 to the interface 704. Infotainment output data 754 may comprise, for example, a plurality of digital and/or analog signals usable to generate audio and/or visual output, e.g., to a plurality of speakers within the infotainment system. Furthermore, the interface 704 is configured to send infotainment input data 756 to the second head-unit 706, e.g., data from the FM radio antenna, data from Bluetooth connectivity, and the like. The fourth phase 750 represents normal operation of the interface 704 and the second head-unit 706, and therefore repeats continuously any time the vehicle is turned on. Infotainment input data 756 and infotainment output data 754 are transmitted/received through the use of the reconfigurable inputs/outputs configured during the third phase 740. It should be noted that infotainment output data 754 and infotainment input data 756 may be transmitted and received simultaneously.

FIG. 8 shows a communication diagram 800. Diagram 800 shows the communication between three devices: a head-unit 806, an interface 804, and an external database 808. The head-unit 806 is an example of the head-unit 340 of FIG. 3. The interface 804 is an example of the interface 302, and the external database 708 is an example of the external database 320. The example communication in diagram 800 is a non-limiting example of the communication between the three devices as would occur during the execution of method 500. Time is represented by the direction of a vertical axis 801. Within diagram 800, tails of arrows represent the origin of a message and the heads of arrows represent the destination of the message.

The example diagram 800 includes a first phase 820, during which the interface 804 establishes communications and authorizes the head-unit 806 according to a list of authorization data stored on the external database 808. The first phase 820 is initiated by the interface 804 when the interface 804 sends an authorized authentication data list request 822 to the external database 808. In some examples, communication between the external database 808 and the interface 804 may be sustained through the use of an Internet connection, e.g., via wireless or wired connectivity. The external database 808 responds to the authorized authentication data list request 822 by sending an authorized authentication data list 824 to the interface 804.

As explained above with respect to FIGS. 3, 4, and 5, the authorized authentication data list 824 is usable to check whether or not the head-unit 806 is authorized. To this end, the interface 804 sends an authentication request 826 to the head-unit 806. The authentication request 826 is a request for the authentication data of the head-unit 806, e.g. authentication data 366. The head-unit 806 sends authentication data 828 to the interface 804. The authentication data 828 is checked against the authorized authentication data list 824, allowing for the interface 804 to determine whether or not the head-unit 806 is authorized. If the head-unit 806 is authorized, the interface 804 sends an authentication code 830 to the head-unit 806. In the example described in diagram 800, the head-unit 806 is determined to be authorized. Were the head-unit 806 not to be authorized, the interface 804 would instead send a notification to the head-unit detailing that it is not authorized.

Assuming the head-unit 806 is authorized, communication proceeds to a second phase 840, during which the head-unit 806 is set up. The second phase 840 starts when the interface 804 sends an input/output configuration data request 842 to the head-unit 806. In response, the head-unit 806 is configured to send its input/output configuration data 844, which is an example of the input/output configuration data 364 of FIG. 3. The input/output configuration data 844 is usable by the interface 804 to reconfigure the inputs/outputs according to the specifications of the head-unit 806. This may include adjusting which connectors within the inputs/outputs are connected to corresponding connectors on the head-unit 806. After reconfiguring the inputs/outputs, the head-unit 806 is allowed to electrically couple to various subsystems of the vehicle infotainment system to the head-unit 806. Physical interfaces for the inputs and/or outputs are maintained and not physically modified even after inputs and/or outputs have been reconfigured.

After the inputs/outputs are reconfigured, communication proceeds to the third phase 850, wherein the head-unit 806 is configured to transmit infotainment output data 854 to the interface 804. Infotainment output data 854 may comprise, for example, a plurality of digital and/or analog signals usable to generate audio and/or visual output, e.g. to a plurality of speakers within the infotainment system. Furthermore, the interface 804 is configured to send infotainment input data 856 to the head-unit 806, e.g. data from the FM radio antenna, data from Bluetooth connectivity, and the like. The third phase 850 represents normal operation of the interface 804 and the head-unit 806, and therefore repeats continuously any time the vehicle is turned on. Infotainment input data 856 and infotainment output data 854 are transmitted/received through the use of the reconfigurable inputs/outputs configured during the second phase 840. It should be noted that infotainment output data 854 and infotainment input data 856 may be transmitted and received simultaneously.

As described above, an ability to upgrade a cockpit domain controller of a vehicle may be further enhanced by configuring the cockpit domain controller with a scalable connectivity architecture, where the scalable connectivity architecture includes hardware components, with associated software elements, that allows vehicle subsystems to be readily modified and added. Further, modification of an infotainment systems may be achieved with minimal replacement of the hardware components and minimal disruption of operation of original equipment manufacturer (OEM) subsystems. The following descriptions of FIGS. 9-14 are directed to aspects and benefits of the scalable connectivity architecture.

Turning now to FIG. 9, a set of connectors 902 used in a connectivity interface of a conventional cockpit domain controller of a vehicle is shown. Each of the set of connectors 902 may be configured to couple to a vehicle cable electronically and/or communicatively coupling a vehicle subsystem (such as audio subsystems, ADAS subsystems, etc.) to the cockpit domain controller. As such, the connectivity interface may enable coupling of the cockpit domain controller to at least vehicle cable. A number headers and interfaces in the set of connectors 902 may increase with an increase in a number of desired displays and devices inside and outside of the vehicle. Additionally, as Gateway functions are realized, a quantity of communication links, such as Ethernet, CAN and LIN connections, may also increase, straining a capacity of the cockpit domain controller dimensions to accommodate the connections.

As described herein, a scalable connectivity architecture may include modular headers 900 configured with openings and ports arranged in a strategic manner, thereby condensing the interfaces of the set of connectors 902 into areas provided by the modular headers 900. The openings and ports may be configured to receive pins and terminals, and other connection types, in an exchangeable, reconfigurable manner, allowing, in some instances, for more than one vehicle cable to be coupled to each of the modular headers 900. For example, the pins, terminals, and other types of connections may be added to or removed from the available openings and ports of the modular headers 900 as desired. The modular headers 900 may therefore provide an equivalent number of interfaces with a reduced footprint while providing flexibility with respect to selection of subsystems to be included in the vehicle.

An electronic configuration 1000, e.g., herein referred to as a compute module 1000, of a scalable connectivity architecture for a cockpit domain controller is depicted in FIG. 10. The electronic configuration may include an SOC 1002 which may integrate various computer components onto a microchip, including a central processing unit (CPU), memory interfaces, on-chip input/output devices and interfaces, etc. The SOC 1002 may be from various suppliers and may, in some examples, be coupled to an additional SOC with direct chip to chip connectivity. The SOC 1002 may be used for a specific supplier or may be standardized to be usable amongst a variety of suppliers, e.g., generic.

The scalable connectivity architecture may also rely on a first PMIC 1004 and a second PIMC 1006, which may be a master PMIC and a slave PMIC, respectively. The PMICs may provide power management in the cockpit domain controller by controlling flow and direction of electrical power. For example, the PMICs may supervise voltage and current delivered to the cockpit domain controller from an external power source. The first PMIC 1004 may regulate power flow to and from a first, e.g., primary, set of subsystems to which the cockpit domain controller is coupled. In one example, all vehicle subsystems may be coupled to the first PMIC 1004, e.g., all OEM subsystems of the vehicle. The slave PMIC may be configured to a regulate power flow to and from a second, e.g., secondary, set of subsystems based on a power state of the first set of subsystems, as moderated by the first PMIC 1004. In one example, the slave PMIC may be coupled optional subsystems of the vehicle, e.g., subsystems selected by a user to be added. For example, the second set of subsystems may be higher end variants of the vehicle subsystems. The first and second PMICs 1004, 1006 may therefore deliver power to the SOC 1002, as indicated by arrows 1008. Further, the PMICs and the SOC may be communicatively coupled and signal transmission between the components are indicated by arrows 1010.

As shown in FIG. 10 by dashed arrows 1012, the PMICs may also sense, e.g., monitor, a voltage at a microcontroller unit (MCU) 1014 of the scalable connectivity architecture. Additionally, power may be transmitted to the MCU 1014 from the PMICs as indicated by arrows 1016. The MCU 1014 may be a scalable CPU of the cockpit domain controller, configured similarly with scalable memory. The MCU 1014 may manage control and diagnosis of the scalable connectivity architecture via an interface and an application programming interface (API) configured to be compatible with a wide range of formats and protocols, e.g., generic. The MCU 1014 may therefore be used in conjunction with a mainboard 1018 (a main circuit board) of the cockpit domain controller, regardless of a communication protocol type of the mainboard 1018. For example, the communication protocol of the MCU 1014 may be independent of hardware-based control signals of the SOC 1002 and the first and second PMICs 1004, 1006, thus allowing the scalable connectivity architecture to be standardized with respect to the mainboard 1018. Furthermore, implementation of the MCU 1014 precludes accounting for timing requirements at the mainboard 1018 in order to control power states of the compute module 1000, as such power states may differ according to SOC and PMIC types. The MCU 1014 may be configured to perform diagnostics, such as SOC power rail voltage, directly at the compute module 1000, while maintaining power transmission within target ranges.

The compute module 1000 may also include other components not shown in FIG. 10 for brevity. For example, the compute module 1000 may additionally be configured with at least one dynamic random access memory (DRAM), an expanded serial peripheral interface (xSPI), an authentication chip, a security chip, universal flash storage (UFS), additional optional SOCs, graphics processing units (GPUs), neural processing units (NPUs), etc. Further, the mainboard 1018 may include various peripherals, including but not limited to CPUs, memory, communication protocol cards, graphics cards associated with GPUs, and other input/output devices.

Signals transmitted between the MCU 1014 and the mainboard 1018 are indicated by arrows 1020. The signals may include, for example, universal asynchronous receiver/transmitter signals UART for exchanging serial data between devices (such as standard power control UART communication), interrupt requests, module reset out signals, and spare control signals. The compute module 1000 may be enclosed within a housing as a silver box which may be connected, e.g., the MCU 1014 may be coupled to the mainboard 1018, via an edge connector coupled to gold fingers (not shown in FIG. 10). In one example, the mainboard 1018 may be configured with the gold fingers while the compute module 1000 may include the edge connector, which may allow for cost effective connection by precluding connector construction on the mainboard 1018. As the mainboard 1018 is always used (e.g., fixed in the cockpit domain controller), the connector (e.g., the edge connector) may be positioned on the optional compute module of the scalable connectivity architecture of the cockpit domain controller.

In instances where the compute module 1000 is exchanged for a different compute module, user data stored at the MCU 1014 may be transmitted to an external server or on-board member of the vehicle, such as at storage device 208 of FIG. 2 or the external database 320 of FIG. 3, via the connection (e.g., as provided by the edge connector and the gold fingers) between the MCU 1014 and the mainboard 1018. Upon installation of the different compute module, the user data may be transmitted from the external server or onboard member of the vehicle, to an MCU of the cockpit domain controller, thereby restoring relevant previous settings and data specific to the user.

A compute module (e.g., an electronic configuration) of a scalable connectivity architecture of a cockpit domain controller may have an electromechanical construction that varies depending on a number of desired connection interfaces, e.g., ports. For example, a hardware partitioning of the compute module may be selected according to end-use. A first example of an electromechanical construction 1100 of a compute module 1102 for a cockpit domain controller is depicted in FIG. 11 as a block diagram.

As shown in FIG. 11, the compute module 1102 may be coupled to a mainboard 1104 via gold fingers 1105 of the mainboard 1104 and an edge connector 1106 of the compute module 1102. The gold fingers 1105 may be columns protruding from an edge of a PCB of the mainboard 1104 which may be inserted into the edge connector 1106. The edge connector 1106 may be a portion of a PCB of the compute module 1102 with traces leading to a socket portion of the edge connector 1106. In other examples, however, other strategies for coupling the mainboard 1104 to the compute module 1102 are possible.

The compute module 1102 may include an SOC 1108, DRAMs 1110, and MCU 1112, and an xSPI 1114. In the electromechanical construction 1100 of FIG. 11, the compute module 1102 may include a single, main SOC (e.g., the SOC 1108), allowing space for subsequent coupling of an additional compute module 1102 or replacement with a larger compute module, when desired.

A second example of an electromechanical construction 1200 of a compute module 1202 of a cockpit domain controller is illustrated in FIG. 12. The mainboard 1104 of FIG. 11 is similarly shown in FIG. 12, to which the compute module 1202 may be coupled as described above. The compute module 1202 may be configured as an extended card having a first SOC 1204, with a first set of DRAMs 1206, and a first xSPI 1208, as well as a second SOC 1210 having a second set of DRAMs 1212 and a second xSPI 1214. In some examples, the second SOC 1210 may alternatively be a GPU, an NPU, or another type of hardware extension. Each of the first and second SOC 1204, 1210 may be electronically and communicatively coupled to a MCU 1216.

In the electromechanical construction 1200 of FIG. 12, the extended configuration of the compute module 1202 may allow more than one SOC to be coupled to the mainboard 1104 without demanding modifications to the mainboard 1104. A number of subsystems coupled to the cockpit domain controller, and to the mainboard 1104, may be increased without imposing costly alterations to an in-vehicle computing system.

In one example, the first SOC, and associated components, may correspond to a first set of subsystems of the vehicle that are OEM subsystems, e.g., all vehicle subsystems of the vehicle upon manufacture of the vehicle. The second SOC and associated components, may correspond to a second set of subsystems which may be aftermarket, optional subsystems, that are selectable and added based upon user desire. As such, operation of the first set of subsystems may be maintained whether the second set of subsystems are present or absent. As such a flexibility of subsystem incorporation is provided by the scalable connectivity architecture of the cockpit domain controller.

A third example of an electromechanical construction 1300 of a compute module 1302 of a cockpit domain controller is illustrated in FIG. 13. The mainboard 1104 of FIG. 11 is similarly shown in FIG. 13, to which the compute module 1302 may be coupled as described above. The compute module 1302 may be divided amongst two cards, including a first card 1304 and a second card 1306. The first card 1304 includes a first edge connector 1308 for coupling of the first card 1304 to the gold fingers 1105 of the mainboard 1104, a first SOC 1310, a first set of DRAMs 1312, a first xSPI 1314, and a first MCU 1316. The second card 1306 includes a second edge connector 1318 for coupling of the second card 1306 to the gold fingers 1105 of the mainboard 1104, a second SOC 1320, a second set of DRAMs 1322, a second xSPI 1324, and a second MCU 1326.

Similar to the electromechanical construction 1200 of FIG. 12, each SOC, and associated components, may correspond to a set of subsystems of the vehicle. For example, the first card 1304 may correspond to OEM subsystems and the second card 1306 may correspond to aftermarket subsystems, or vice versa. As such, a flexibility, modularity, and scalability of the scalable connectivity architecture may be increased relative to the electromechanical construction 1200 of FIG. 12.

By dividing the compute module across two cards, each card having an independent MCU, the electromechanical construction 1300 of FIG. 13 may accommodate an increased number of connection interfaces, e.g., relative to the electromechanical construction 1100 of FIG. 11, corresponding to various subsystems while providing greater modularity and scalability relative to the electromechanical construction 1200 of FIG. 12. For example, the electromechanical construction 1200 of FIG. 12 may be a lower cost compute module by incorporating fewer components than the electromechanical construction 1300 of FIG. 1. However, if removal of at least one subsystem is desired, replacement of the compute module may be demanded. In contrast, the electromechanical construction 1300 of FIG. 13 may allow discrete coupling of subsystems, therefore enabling removal or additional of subsystems corresponding to one card without affecting coupling of subsystems corresponding to the other card.

A mechanical configuration of the cockpit domain controller corresponding to a scalable connectivity architecture thereof may be constructed according to the scalable connectivity architecture. As an example, a cockpit domain controller silver box 1400 is shown in FIG. 14. A housing 1402 of the silver box 1400 is depicted as transparent in FIG. 14 to depict inner components of the silver box 1400. For example, the silver box 1400 may enclose a fan 1414 for directing cooling air flow through thermal channels of the silver box 1400. A compute module 1404 of a scalable connectivity architecture of the cockpit domain controller may be coupled to a detachable panel 1406 of the silver box 1400. The compute module 1404 may have any of the electromechanical constructions of FIGS. 11-13 and may be connected to a mainboard 1408 of the cockpit domain controller via a connection 1407, such as an edge connector/gold fingers connection, as described above. For example, the mainboard 1408 may include a first portion 1407a of the connection 1407, which may be configured as gold fingers, and the compute module 1404 may include a second portion 1407b of the connection 1407, which may be at least one edge connector. In one example, the edge connector(s) of the compute module 1404 may be exchangeable and therefore customizable according to the gold fingers of the mainboard 1408. By coupling the compute module 1404 to the detachable panel 1406, the compute module 1404 may be readily accessed and the compute module 1404 may be removed and/or replaced without demanding removal of the silver box 1400 from a position of the silver box 1400 within a vehicle or removing the mainboard 1408.

At a connection interface 1409 of the silver box 1400, which may be a side of the silver box 1400 opposite of the detachable panel 1406, the silver box 1400 may include a first header 1410 and a second header 1412. The headers may include couplings such as various ports, pins, terminals, etc., for electronically and communicatively coupling to subsystems of a vehicle and may be electronically and communicatively coupled to the compute module 1404. As an example, the headers may be configured similarly to the set of headers 900 of FIG. 9, where various openings are available in the headers for incorporating different arrangements of hardware connections for coupling the cockpit domain controller to at least vehicle cable connected to one or more vehicle subsystems. For example, the first header 1410 may be coupled, via the mainboard 1408, to a first SOC of the compute module, and therefore to subsystems associated with the first SOC, and the second header 1412 may be coupled, also via the mainboard 1408, to a second SOC of the compute module 1404, and therefore to subsystems associated with the second SOC.

In some examples, at least a portion of connection paths (e.g., the ports, pins, terminals, and other hardware interfaces, etc.) of each of the headers may not be utilized. In other words, all or less than all connector paths of the headers may be utilized, e.g., by a vehicle cable. The connection paths of the first header 1410 and the second header 1412, however, may be different from one another and at least one of the headers includes connector paths not utilized by the vehicle subsystems. Unused connection paths are therefore available for coupling of additional, auxiliary subsystems, such as aftermarket subsystems, to the cockpit domain controller. Furthermore, any mechanical coupling of vehicle cables to the cockpit domain controller may be realized at the connection interface 1409, e.g., at the first header 1410 and the second header 1412, precluding any other connectors in or through the silver box 1400.

As one example, the first header 1410 may be connected to OEM subsystems and may therefore be continually (e.g., always) connected to the subsystems unless maintenance is demanded. The second header 1412 may provide connections for optional, aftermarket subsystems and therefore a connection status of the second header 1412 may vary, depending on whether incorporation of aftermarket subsystems is desired. As described above with reference to FIG. 9, the headers may be reconfigurable, allowing a number and type of interfaces of the headers to be adjusted. As such, a combination of the exchangeable compute module 1404 and reconfigurable headers may enable the cockpit domain controller to be a modular, scalable system able to readily accommodate user-specific preferences with respect to incorporation of vehicle subsystems.

An example of a method 1500 for upgrading hardware and/or software of a vehicle infotainment system is shown in FIG. 15. Method 1500 may be executed by a user or a technician to vary a mechanical configuration of a cockpit domain controller of a vehicle, where the cockpit domain controller may control the vehicle infotainment system according to input received at a head-unit of the cockpit domain controller. Varying the mechanical configuration may also modify software associated with the hardware for providing instructions to the cockpit domain controller, e.g., to a mainboard of the cockpit domain controller. In one example, the cockpit domain controller may be the cockpit domain controller of FIG. 14, having a housing and a scalable connectivity architecture including more than one header with modular interfaces for coupling to one or more vehicle cables, as well as a modular and scalable compute module connected to the mainboard of the cockpit domain controller.

At 1502, method 1500 includes storing data corresponding to subsystems coupled to the vehicle via the cockpit domain controller. For example, the user or technician may initiate transfer of the data stored at a memory of the cockpit domain controller to a storage device of an in-vehicle computing system communicatively coupled to the cockpit domain controller. In other examples, the data may be automatically stored at the in-vehicle computing system upon initial coupling of the subsystems, such as during vehicle manufacture and assembly. The data may include user settings, operating instructions specific to a type of subsystem, data uploaded to the cockpit domain controller by the user/technician, etc.

At 1504, method 1500 includes coupling at least one new subsystem to one of the headers of the cockpit domain controller. Coupling the new subsystem may include connecting at least one vehicle cable, the vehicle cable being a communication cable of the new subsystem, to one of the headers of the cockpit domain controller. For example, a first header of the headers may include connector paths to all original (e.g., not new) subsystems of the vehicle. A second header of the headers may include unoccupied interfaces for receiving new vehicle cables for new subsystems. In some examples, the unoccupied interfaces may be rearranged to accommodate a specific type of connection of the new subsystem. For example, pins and terminals of the interfaces may be removed, added, and/or relocated as demanded by the new subsystem. In another examples, coupling the new subsystem may include replacing one of the original subsystems, e.g., coupled to the first header, with an upgraded version of the original subsystem. In yet another example, no new subsystem may be added and instead, one of the original subsystems may be removed.

Various combinations of concurrently adding, removing, and exchanging the subsystems coupled to the cockpit domain controller are possible, At 1506, method 1500 optionally includes exchanging an original compute module for a new, upgraded compute module enabling control of the new subsystem. For example, each of the original and the new compute modules may be any of the compute modules of FIGS. 11-13. The original compute module may not already include instructions saved in a memory of the compute module for operating the new subsystem. Therefore, exchange of the original compute module for the new compute module, the compute module configured with instructions for operating the original subsystems as well as the new subsystem, may be demanded. Furthermore, exchanging the original compute module for the new compute module may include verifying and authenticating the new compute module and the new subsystem. In some examples, the original compute module may already be configured to operate the new subsystem and replacing of the original compute module is therefore obviated.

At 1508, method 1500 optionally includes retrieving the data stored at 1502, identifying relevant data, and restoring the data while synchronizing data pertaining to the original subsystems with data pertaining to the new subsystem, when the compute module has been exchanged. Further, in instances where one of the original subsystems is removed, data corresponding to the removed subsystems may be identified and not restored to the compute module. Identifying the relevant data may also include determining which data is already stored at the compute module or what data at the compute module is related to the stored data, and compiling and organizing the related data. For the original subsystems that remain unchanged, the corresponding data may be identified, restored and, in some examples, re-verified and re-authenticated.

In some examples, an infotainment system product line may be provided having a first cockpit domain controller with one header for all subsystems of a vehicle. The infotainment system product line may also include a second cockpit domain controller with two headers, where a first header of the headers includes couplings for all subsystems of the vehicle (e.g., the first header is equivalent to the header of the first cockpit domain controller) and a second header of the headers includes couplings for additional subsystems of the vehicle. The additional subsystems may be aftermarket, optional subsystems, including higher variants of the original subsystems. The first cockpit domain controller may be exchanged for the second cockpit domain controller in the vehicle to accommodate an anticipated desire for incorporating the additional subsystems. In addition to having more than one header, the second cockpit domain controller may also include scalable CPU and memory, couplings that are exchangeable, replaceable, and/or relocatable, and a compute module that is also exchangeable and/or replaceable. In some examples, the couplings and associated connector paths (e.g., communication routes and formats) may be different for the second header versus the first header, thereby expanding a number and a range of connection types encompassed by the second cockpit domain controller, relative to the first cockpit domain controller.

In this way, a head-unit of a cockpit domain controller may be replaced with a different head-unit without loss of user-defined data. The head-unit may be readily updated and/or upgraded according to user desire while preserving settings and parameters set by the user in the original head-unit. A modularity of the cockpit domain controller may be further enhanced by adapting the cockpit domain controller with a scalable connectivity architecture that provides more flexible coupling of subsystems to a vehicle. The scalable connectivity architecture may include more than header, each header having optimized arrangements of connections to maximize a number of available interfaces of the cockpit domain controller. Further, the available interfaces may be rearranged and modular, allowing the interfaces to be customized according to user preference. In addition, the scalable connectivity architecture may also include exchangeable, reconfigurable compute modules to enable flexible, modular, and scalable coupling of the compute modules to a mainboard of the cockpit domain controller, where the compute modules may provide instructions and data for operating the subsystems. As a result, the cockpit domain controller may be modified and/or upgraded at low cost, thereby prolonging its useful life.

A technical effect of using a standardized connection between an interface and a head-unit is to prevent head-units unauthorized by the manufacturer of the interface to establish connections to the vehicle infotainment system. Furthermore, during the exchange of a first head-unit for a second head-unit, a collection of user preferences from the first head-unit may be made persistent through downloading them to the second head-unit. In addition, the reconfigurable inputs/outputs and modular interface of the cockpit domain controller allow for easier upgrades to the head-unit and incorporation of additional subsystems, thereby prolonging a duration that the vehicle infotainment system is relevant and useful, since many audio processing features and/or connectivity features may be upgraded as new head-units are developed.

A further technical effect of including a scalable connectivity architecture in the cockpit domain controller is that upgrades and additions to subsystems of a vehicle may be performed with reduced modifications to hardware components of the cockpit domain controller. Data associated with the subsystems incorporated in the vehicle and controlled by the cockpit domain controller, may be stored at a location independent of the cockpit domain controller and restored when headers of the cockpit domain controller are altered, reconfigured, and/or replaced. The scalable connectivity architecture also contributes to a useful life of the vehicle infotainment system, as well as increased customizability to a user's preferences.

In another representation, an upgradable cockpit for a vehicle, comprises a processor, an interface communicatively connected to the processor, the interface having a plurality of inputs and outputs, wherein the plurality of inputs and outputs of the interface are configured for one or more features of a head-unit when the processor detects connection of the head-unit to the interface, authenticates the head-unit for operation in the vehicle, and downloads user preferences to the head-unit. In yet another representation, an upgradable cockpit for a vehicle, comprises a processor, an interface communicatively connected to the processor, the interface having a plurality of reconfigurable inputs and outputs, wherein the plurality of inputs and outputs of the interface are reconfigured for one or more features of a head-unit via an updated mapping of inputs and/or outputs to sensors and actuators, respectively.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The methods may be performed by executing stored instructions with one or more logic devices (e.g., processors) in combination with one or more additional hardware elements, such as storage devices, memory, hardware network interfaces/antennae, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The disclosure also provides support for a system for coupling with at least one vehicle cable for communication with components of an infotainment system, comprising: a housing, a domain controller with hardware components enclosed within the housing, and a first connector interface arranged at a first side of the housing, the first connector interface including all connections for the domain controller.

In a first example of the system, the domain controller has a scalable connectivity architecture to enable variation in a number of vehicle subsystems coupled to the domain controller. In a second example of the system, optionally including the first example, the scalable connectivity architecture includes the first connector interface and a second connector interface, the second connector interface including unoccupied connections for coupling additional vehicle subsystems to the domain controller. In a third example of the system, optionally including one or both of the first and second examples, connections of the second connector interface, the connections configured to receive at least one additional vehicle cable for communication with the additional vehicle subsystems, are removable, exchangeable, and replaceable. In a fourth example of the system, optionally including one or more or each of the first through third examples, the domain controller includes a mainboard enclosed within the housing and a compute module coupled to a detachable panel of the housing. In a fifth example of the system, optionally including one or more or each of the first through fourth examples, the compute module includes a microprocessor for controlling operation of vehicle subsystems coupled to the domain controller, and one or more systems-on-a-chip (SOCs). In a sixth example of the system, optionally including one or more or each of the first through fifth examples, the compute module includes one SOC on a card, and wherein the card is coupled to the mainboard. In a seventh example of the system, optionally including one or more or each of the first through sixth examples, the compute module includes two SOCs on a card, and wherein the card is coupled to the mainboard. In an eighth example of the system, optionally including one or more or each of the first through seventh examples, the compute module includes a first SOC on a first card, and a second SOC on a second card, and wherein the first card and the second card are each coupled to the mainboard. In a ninth example of the system, optionally including one or more or each of the first through eighth examples, the compute module includes an edge connector and the mainboard includes gold fingers, and wherein the gold fingers are inserted into the edge connector to couple the mainboard to the compute module.

The disclosure also provides support for a method for upgrading hardware and/or software of a vehicle infotainment system, comprising: maintaining connections to subsystems of a vehicle at a first header of a connection interface of a domain controller while connecting at least one additional subsystem to a second header of the connection interface, wherein couplings of the second header are exchangeable and relocatable. In a first example of the method, the couplings include pins, terminals, and ports for connecting a communication cable to the second header. In a second example of the method, optionally including the first example, the subsystems are also connected to the first header via couplings of the first header, and wherein an arrangement of the couplings of the first header is different from an arrangement of the couplings of the second header. In a third example of the method, optionally including one or both of the first and second examples, data corresponding to the subsystems of the vehicle is stored at a memory of an in-vehicle computing system prior to connecting of the at least one additional subsystem and, upon connecting of the at least one additional subsystem, the data is retrieved from the in-vehicle computing system and restored at a compute module of the domain controller. In a fourth example of the method, optionally including one or more or each of the first through third examples, the method further comprises: exchanging an original compute module of the domain controller for a new compute module having a system-on-a-chip for controlling the at least one additional subsystem when instructions for controlling the at least one additional subsystem are not included in the original compute module.

The disclosure also provides support for an infotainment system product line, including: a first domain controller for a first vehicle for use with a first infotainment system, the first domain controller having a first header with a first set of connector paths, and a second domain controller for a second vehicle for use with a second infotainment system, the second domain controller having the first header of the first domain controller and a second header with a second set of connector paths. In a first example of the system, the second domain controller includes scalable CPU and memory. In a second example of the system, optionally including the first example, there are no other connectors or headers in or through the first domain controller or the second domain controller. In a third example of the system, optionally including one or both of the first and second examples, the first header and/or the second header includes connector paths that are not utilized, and wherein the second set of connector paths is different than the first set of connector paths. In a fourth example of the system, optionally including one or more or each of the first through third examples, the second domain controller includes different hardware and/or software than the first domain controller, and housings of each of the first domain controller and the second domain controller are configured as silver boxes.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method for upgrading hardware and/or software of a vehicle infotainment system, comprising:
   storing subsystem data corresponding to of a plurality of subsystems of the vehicle in a memory of a domain controller of the vehicle; and
   while maintaining connections to the plurality of subsystems at a first header of a first connection interface of the domain controller:
   connecting at least one additional subsystem to a second header of the first connection interface;
   exchanging a first compute module of the domain controller with an upgraded compute module of the domain controller;
   retrieving the stored subsystem data from the memory; and
   restoring the subsystem data at the upgraded compute module, including synchronizing a first set of subsystem data pertaining to the plurality of subsystems with a second set of subsystem data pertaining to the at least one additional subsystem;
   wherein the first connection interface includes all connections of the domain controller, and the domain controller has a scalable connectivity architecture to enable enabling variation in a number of the plurality of subsystems coupled to the domain controller.

2. The method of claim 1, wherein couplings of the second header include pins, terminals, and ports intended for configured to connect a communication cable to the second header.

3. The method of claim 1, wherein the plurality of subsystems are also connected to the first header via couplings of the first header, and wherein an arrangement of the couplings of the first header is different from an arrangement of the couplings of the second header.

4. The method of claim 1, further comprising exchanging an original compute module of the domain controller with a new compute module having a system-on-a-chip for controlling configured to control the at least one additional subsystem when instructions for controlling the at least one additional subsystem are not included in the original compute module.

5. The method of claim 1, wherein the scalable connectivity architecture includes the first connection interface and a second connection interface, the second connection interface including unoccupied connections for coupling configured to couple additional vehicle subsystems to the domain controller.

6. The method of claim 5, wherein connections of the second connection interface, the connections are configured to receive at least one additional vehicle cable enabling communication with the additional vehicle subsystems, and wherein the additional vehicle subsystems are removable, exchangeable, and replaceable.

\* \* \* \* \*